United States Patent
Kinjo et al.

(10) Patent No.: US 11,196,315 B2
(45) Date of Patent: Dec. 7, 2021

(54) DRIVE APPARATUS FOR ROTATING ELECTRIC MACHINE

(71) Applicant: DENSO CORPORATION, Kariya (JP)

(72) Inventors: Hirofumi Kinjo, Nisshin (JP); Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/989,641

(22) Filed: Aug. 10, 2020

(65) Prior Publication Data

US 2020/0373801 A1    Nov. 26, 2020

Related U.S. Application Data

(63) Continuation of application No. PCT/JP2019/004000, filed on Feb. 5, 2019.

(30) Foreign Application Priority Data

Feb. 9, 2018 (JP) .............................. JP2018-022475

(51) Int. Cl.
*H02P 6/10* (2006.01)
*H02K 3/28* (2006.01)
(Continued)

(52) U.S. Cl.
CPC .............. *H02K 3/28* (2013.01); *H02P 25/18* (2013.01); *H02P 27/06* (2013.01)

(58) Field of Classification Search
CPC .......... H02K 3/28; H02K 11/33; H02P 25/18; H02P 27/06; H02P 2209/01; H02P 2201/00; H02P 27/08; H02P 25/22
See application file for complete search history.

(56) References Cited

U.S. PATENT DOCUMENTS

| 2009/0096394 A1* | 4/2009 | Taniguchi | B60L 3/003 318/400.09 |
| 2009/0128076 A1* | 5/2009 | Taniguchi | B60L 1/003 318/400.41 |

(Continued)

FOREIGN PATENT DOCUMENTS

| JP | H06-351283 A | 12/1994 |
| JP | 2018-11490 A | 1/2018 |

OTHER PUBLICATIONS

May 14, 2019 Search Report issued in International Patent Application No. PCT/JP2019/004000.

*Primary Examiner* — Muhammad S Islam
(74) *Attorney, Agent, or Firm* — Oliff PLC

(57) ABSTRACT

A drive apparatus is provided for driving a rotating electric machine having first and second multi-phase coils. The drive apparatus includes first and second inverters, first and second shift switches, and first and second energization controllers. The first energization controller is configured to turn on and off, for each of phase windings of the first and second multi-phase coils, one corresponding pair of upper-arm and lower-arm switches of the first and second inverters while keeping the first and second shift switches in an OFF state. The second energization controller is configured to turn on and off, for each corresponding pair of the phase windings of the first and second multi-phase coils, one corresponding upper-arm switch of the first inverter and one corresponding lower-arm switch of the second inverter respectively for first energization periods and second energization periods that are alternately set while keeping the shift switches in an ON state.

12 Claims, 12 Drawing Sheets

(51) Int. Cl.
   *H02P 25/18*   (2006.01)
   *H02P 27/06*   (2006.01)

(56) References Cited

U.S. PATENT DOCUMENTS

| | | | | |
|---|---|---|---|---|
| 2012/0139380 | A1 | 6/2012 | Taniguchi | |
| 2012/0286705 | A1* | 11/2012 | Tanaka | H02P 27/08 |
| | | | | 318/139 |
| 2013/0264981 | A1* | 10/2013 | Taniguchi | B62D 5/046 |
| | | | | 318/400.26 |
| 2014/0253006 | A1* | 9/2014 | Satou | H02P 25/22 |
| | | | | 318/442 |
| 2014/0375154 | A1* | 12/2014 | Sugiura | H02K 3/12 |
| | | | | 310/54 |
| 2016/0248349 | A1* | 8/2016 | Kano | H02P 25/22 |
| 2016/0248350 | A1* | 8/2016 | Suzuki | H02P 27/08 |
| 2017/0117834 | A1* | 4/2017 | Fujii | H02P 27/06 |
| 2017/0187316 | A1* | 6/2017 | Kobayashi | H02K 7/006 |
| 2017/0271937 | A1* | 9/2017 | Takei | H02K 3/38 |
| 2018/0309387 | A1* | 10/2018 | Hosokawa | H02J 3/381 |

* cited by examiner

DRIVE APPARATUS FOR ROTATING ELECTRIC MACHINE

CROSS-REFERENCE TO RELATED APPLICATIONS

The present application is a continuation application of International Application No. PCT/JP2019/004000 filed on Feb. 5, 2019, which is based on and claims priority from Japanese Patent Application No. 2018-022475 filed on Feb. 9, 2018. The contents of these applications are hereby incorporated by reference in their entirety into the present application.

BACKGROUND

1 Technical Field

The present disclosure relates to drive apparatuses for rotating electric machines.

2 Description of Related Art

There is known a drive apparatus for a rotating electric machine. This drive apparatus is configured to shift (or switch) the drive mode (or control mode) of the rotating electric machine between a low-speed rotation mode and a high-speed rotation mode. Specifically, the rotating electric machine includes three phase windings that are Y-connected to define a neutral point therebetween. The drive apparatus includes three switch pairs respectively corresponding to the phase windings of the rotating electric machine and each consisting of an upper-arm switch and a lower-arm switch that are connected in series with each other. Moreover, the drive apparatus also includes a mode shift switch that is connected to the neutral point of the rotating electric machine. In response to the mode shift switch being turned off, the drive mode of the rotating electric machine is shifted to the low-speed rotation mode in which the rotating electric machine is full-wave-driven by the drive apparatus. In contrast, in response to the mode shift switch being turned on, the drive mode of the rotating electric machine is shifted to the high-speed rotation mode in which the rotating electric machine is half-wave-driven by the drive apparatus. By shifting the drive mode of the rotating electric machine as above, it is possible to obtain two different torque characteristics respectively in the low-speed and high-speed rotation modes.

SUMMARY

According to the present disclosure, there is provided a drive apparatus for driving a rotating electric machine.

The rotating electric machine includes a stator core and first and second multi-phase coils wound on the stator core. The first multi-phase coil is composed of at least three phase windings that are connected together to define a first neutral point therebetween. The second multi-phase coil is composed of at least three phase windings that are connected together to define a second neutral point therebetween.

The drive apparatus includes:

a first inverter connected with a DC power supply, the first inverter including at least three switch pairs respectively corresponding to the phase windings of the first multi-phase coil and each consisting of an upper-arm switch and a lower-arm switch that are connected in series with each other, the first inverter being configured to energize each of the phase windings of the first multi-phase coil by turning on and off the corresponding upper-arm and lower-arm switches of the first inverter;

a second inverter connected with the DC power supply, the second inverter including at least three switch pairs respectively corresponding to the phase windings of the second multi-phase coil and each consisting of an upper-arm switch and a lower-arm switch that are connected in series with each other, the second inverter being configured to energize each of the phase windings of the second multi-phase coil by turning on and off the corresponding upper-arm and lower-arm switches of the second inverter;

a first shift switch provided in an electrical path that connects the first neutral point of the first multi-phase coil to a lower potential side of the DC power supply;

a second shift switch provided in an electrical path that connects the second neutral point of the second multi-phase coil to a higher potential side of the DC power supply;

a first energization controller configured to control energization of the first and second multi-phase coils by turning on and off, for each of the phase windings of the first and second multi-phase coils, the corresponding upper-arm and lower-arm switches in a complementary manner for a same energization period while keeping both the first and second shift switches in an OFF state; and a second energization controller configured to control energization of the first and second multi-phase coils by turning on and off, for each corresponding pair of one of the phase windings of the first multi-phase coil and one of the phase windings of the second multi-phase coil, the upper-arm switch of the first inverter corresponding to the phase winding of the first multi-phase coil and the lower-arm switch of the second inverter corresponding to the phase winding of the second multi-phase coil respectively for first energization periods and second energization periods while keeping both the first and second shift switches in an ON state, the first energization periods being set alternately with the second energization periods.

DESCRIPTION OF EMBODIMENTS

Figure 1:
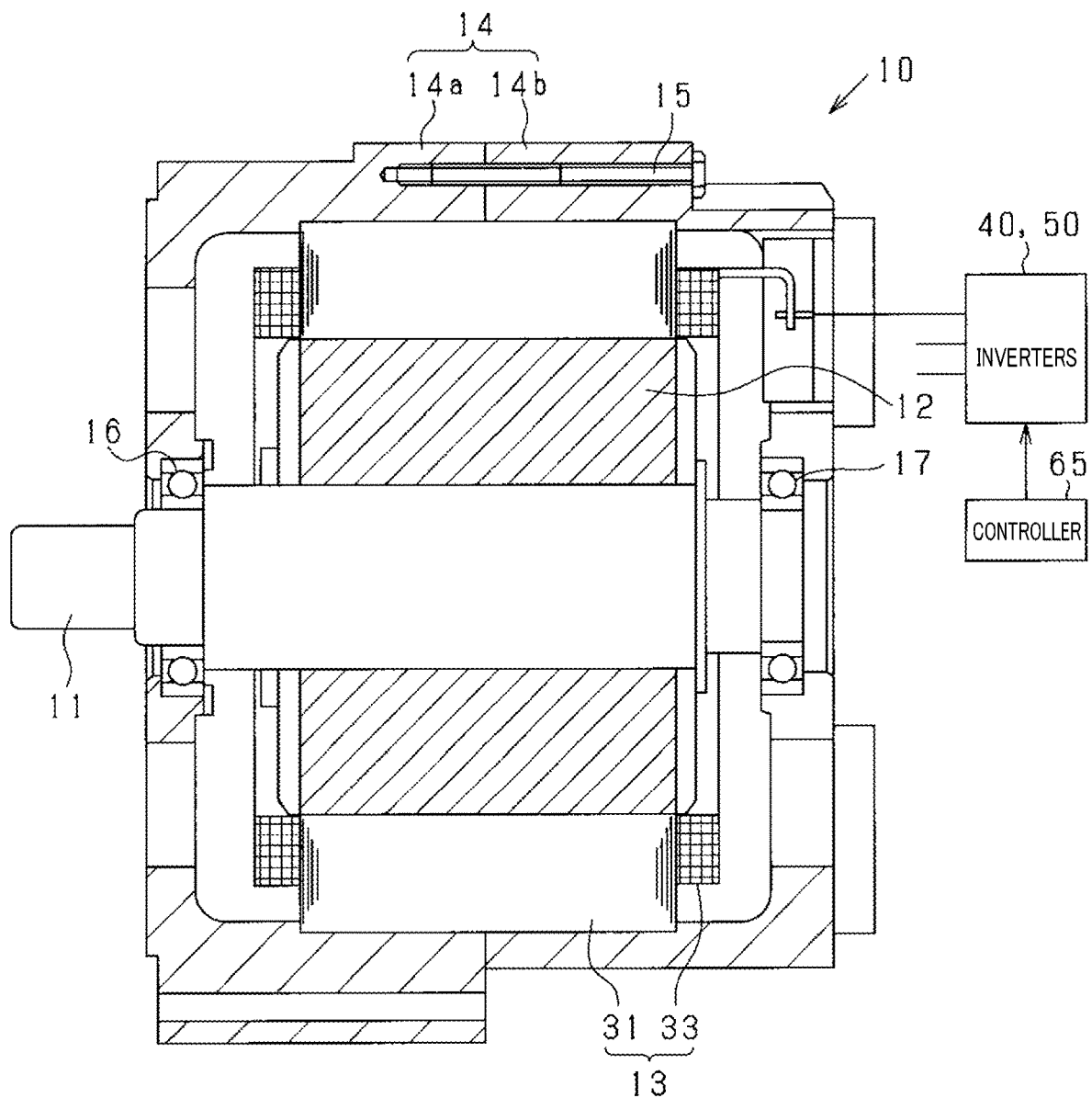
FIG. 1 is a longitudinal cross-sectional view of a rotating electric machine according to a first embodiment.

In the above-described drive apparatus known in the art (see, for example, Japanese Patent Application Publication No. JPH06351283A), it is possible to shift, by turning on and off the mode shift switch, the drive mode of the rotating electric machine between the full-wave drive mode (i.e., low-speed rotation mode) and the half-wave drive mode (i.e., high-speed rotation mode). However, in the half-wave drive mode (i.e., when the rotating electric machine is half-wave-driven by the drive apparatus with the mode shift switch kept in an ON state), torque ripple of the rotating electric machine may be increased.

In contrast, in the above-described drive apparatus according to the present disclosure, the first and second multi-phase coils of the rotating electric machine are energized respectively by the first and second inverters. Moreover, the first shift switch is provided in the electrical path that connects the first neutral point of the first multi-phase coil to the lower potential side of the DC power supply, while the second shift switch is provided in the electrical path that connects the second neutral point of the second multi-phase coil to the higher potential side of the DC power supply. Consequently, it becomes possible to shift (or switch) the drive mode of the rotating electric machine between a full-wave drive mode and a half-wave drive mode by turning on and off the first and second shift switches.

Specifically, with both the first and second shift switches kept in the OFF state (or open state), the first energization controller turns on and off, for each of the phase windings of the first and second multi-phase coils, the corresponding upper-arm and lower-arm switches in a complementary manner for the same energization period. Consequently, the rotating electric machine is driven by the drive apparatus in the full-wave drive mode. In this case, the energization control can be performed on each corresponding pair of one of the phase windings of the first multi-phase coil and one of the phase windings of the second multi-phase coil, which are of the same phase, for the same energization period. Consequently, it becomes possible for the rotating electric machine to output high torque.

Otherwise, with both the first and second shift switches kept in the ON state (or closed state), the second energization controller turns on and off, for each corresponding pair of one of the phase windings of the first multi-phase coil and one of the phase windings of the second multi-phase coil, the upper-arm switch of the first inverter corresponding to the phase winding of the first multi-phase coil and the lower-arm switch of the second inverter corresponding to the phase winding of the second multi-phase coil respectively for first energization periods and second energization periods that are alternately set. Consequently, the rotating electric machine is driven by the drive apparatus in the half-wave drive mode. In this case, each corresponding pair of one of the phase windings of the first multi-phase coil and one of the phase windings of the second multi-phase coil are magnetically coupled with each other on the stator core. Moreover, the first neutral point of the first multi-phase coil is short-circuited to the lower potential side of the DC power supply by the first shift switch while the second neutral terminal of the second multi-phase coil is short-circuited to the higher potential side of the DC power supply by the second shift switch. Consequently, for each corresponding pair of one of the phase windings of the first multi-phase coil and one of the phase windings of the second multi-phase coil, the polarities of phase currents flowing respectively through the phase winding of the first multi-phase coil and the phase winding of the second multi-phase coil change in opposite directions to each other in the consecutive first and second energization periods. Moreover, since the first energization periods are set alternately with the second energization periods, the resultant magnetomotive force is in the form of a full wave. Consequently, though the rotating electric machine is driven in the half-wave drive mode, it becomes possible to obtain a sinusoidal rotating magnetic field as in the full-wave drive mode. As a result, it becomes possible to reduce torque ripple of the rotating electric machine in the half-wave drive mode.

As above, with the drive apparatus according to the present disclosure, it is possible to suitably drive the rotating electric machine selectively in the full-wave and half-wave drive modes while reducing torque ripple of the rotating electric machine in the half-wave drive mode.

In a further implementation, in the drive apparatus according to the present disclosure, the first energization controller may be configured to control, during operation of the rotating electric machine in a first operation region on a lower rotational speed side, energization of the first and second multi-phase coils with both the first and second shift switches kept in the OFF state. The second energization controller may be configured to control, during operation of the rotating electric machine in a second operation region on a higher rotational speed side, energization of the first and second multi-phase coils with both the first and second shift switches kept in the ON state.

With the above configuration, the first and second shift switches may be kept in the ON state or the OFF state depending on whether the rotating electric machine operates in the first operation region or the second operation region. Consequently, it will become possible to suitably obtain different output characteristics of the rotating electric machine in the first and second operation regions. As a result, it will become possible to extend the high-efficiency operation region of the rotating electric machine. Moreover, the applied voltage per unit winding will become higher in the half-wave drive mode than in the full-wave drive mode. Consequently, it will become possible to extend the operation region of the rotating electric machine to the higher rotational speed side (i.e., the second operation region).

In the drive apparatus according to the present disclosure, each of the upper-arm and lower-arm switches of the first and second inverters may be configured with a semiconductor switching element having a flyback diode connected in antiparallel thereto. The first inverter may further include a plurality of first cut-off switches each of which is configured to cut off, during a shift from an energization state where a corresponding one of the upper-arm switches of the first inverter is turned on and off by the second energization controller to an energization state where a corresponding one of the lower-arm switches of the second inverter is turned on and off by the second energization controller, a first return current path that includes the flyback diode of a corresponding one of the lower-arm switches of the first inverter and a corresponding one of the phase windings of the first multi-phase coil. The second inverter may further include a plurality of second cut-off switches each of which is configured to cut off, during a shift from an energization state where a corresponding one of the lower-arm switches of the second inverter is turned on and off by the second energization controller to an energization state where a corresponding one of the upper-arm switches of the first inverter is turned on and off by the second energization controller, a second return current path that includes the flyback diode of a corresponding one of the upper-arm switches of the second inverter and a corresponding one of the phase windings of the second multi-phase coil.

With the above configuration, in the half-wave drive mode, during the shift (or switching) between the half-wave energization of the first multi-phase coil by the first inverter and the half-wave energization of the second multi-phase coil by the second inverter, the first and second return current paths, each of which includes the flyback diode of a corresponding one of the upper-arm and lower-arm switches of the first and second inverters and a corresponding one of the phase windings of the first and second multi-phase coils, will be cut off respectively by the first and second cut-off switches. Consequently, it will become possible to realize suitable commutation between the phase windings of the first multi-phase coil and the phase windings of the second multi-phase coil. As a result, it will become possible to suitably perform the half-wave energization of the first multi-phase coil and the half-wave energization of the second multi-phase coil in a complementary manner.

Further, each of the first cut-off switches may be provided in an AC line, which connects an intermediate point between the corresponding upper-arm and lower-arm switches of the first inverter and the corresponding phase winding of the first multi-phase coil, to selectively allow and block flow of electric current through the AC line. Each of the second cut-off switches may be provided in an AC line, which connects an intermediate point between the corresponding upper-arm and lower-arm switches of the second inverter and the corresponding phase winding of the second multi-phase coil, to selectively allow and block flow of electric current through the AC line. The first energization controller may be configured to keep, when controlling energization of the first and second multi-phase coils, both the first and second shift switches in the OFF state and all of the first and second cut-off switches of the first and second inverters in an ON state. The second energization controller may be configured to: keep, during each of the first energization periods for which one of the upper-arm switches of the first inverter is turned on and off, both the first and second shift switches in the ON state, the first cut-off switch corresponding to the upper-arm switch of the first inverter in the ON state and the second cut-off switch corresponding to the upper-arm switch of the first inverter in an OFF state; and keep, during each of the second energization periods for which one of the lower-arm switches of the second inverter is turned on and off, both the first and second shift switches in the ON state, the first cut-off switch corresponding to the lower-arm switch of the second inverter in an OFF state and the second cut-off switch corresponding to the lower-arm switch of the second inverter in the ON state.

With the above configuration, it will be possible to suitably cut off, during the shift between the half-wave energization of the first multi-phase coil by the first inverter and the half-wave energization of the second multi-phase coil by the second inverter, the first and second return current paths respectively by the first and second cut-off switches.

As an alternative, each of the lower-arm switches of the first inverter may be configured with a pair of semiconductor switching elements connected in series with each other and having respective flyback diodes oriented in opposite directions to each other. Each of the upper-arm switches of the second inverter may be configured with a pair of semiconductor switching elements connected in series with each other and having respective flyback diodes oriented in opposite directions to each other. Each of the first cut-off switches may be constituted of the pair of semiconductor switching elements of the corresponding lower-arm switch of the first inverter. Each of the second cut-off switches may be constituted of the pair of semiconductor switching elements of the corresponding upper-arm switch of the second inverter.

With the above alternative configuration, it will also be possible to suitably cut off, during the shift between the half-wave energization of the first multi-phase coil by the first inverter and the half-wave energization of the second multi-phase coil by the second inverter, the first and second return current paths respectively by the first and second cut-off switches.

Further, in the above alternative configuration, the first energization controller may be configured to: turn on and off, for each of the phase windings of the first multi-phase coil, the corresponding upper-arm switch of the first inverter and one of the pair of semiconductor switching elements of the corresponding lower-arm switch of the first inverter in a complementary manner while keeping the other of the pair of semiconductor switching elements of the corresponding lower-arm switch in an ON state; and turn on and off, for each of the phase windings of the second multi-phase coil, the corresponding lower-arm switch of the second inverter and one of the pair of semiconductor switching elements of the corresponding upper-arm switch of the second inverter in a complementary manner while keeping the other of the pair of semiconductor switching elements of the corresponding upper-arm switch in an ON state.

With the above energization control, it will be possible to enable the current return operation when the power factor is not equal to 1 or enable regenerative operation. Consequently, it will be possible to realize a more suitable full-wave drive of the rotating electric machine.

Otherwise, in the drive apparatus according to the present disclosure, each of the upper-arm switches of the first inverter may be configured with a semiconductor switching element having a flyback diode connected in antiparallel thereto. Each of the lower-arm switches of the first inverter may be configured with a pair of IGBTs (Insulated Gate Bipolar Transistors) connected in antiparallel to each other. Each of the upper-arm switches of the second inverter may be configured with a pair of IGBTs connected in antiparallel to each other. Each of the lower-arm switches of the second inverter may be configured with a semiconductor switching element having a flyback diode connected in antiparallel thereto. For each of the lower-arm switches of the first inverter, a first return current path, which includes the lower-arm switch of the first inverter and a corresponding one of the phase windings of the first multi-phase coil, may be cut off by the pair of IGBTs of the lower-arm switch during a shift from an energization state where a corresponding one of the upper-arm switches of the first inverter is turned on and off by the second energization controller to an energization state where a corresponding one of the lower-arm switches of the second inverter is turned on and off by the second energization controller. For each of the upper-arm switches of the second inverter, a second return current path, which includes the upper-arm switch of the second inverter and a corresponding one of the phase windings of the second multi-phase coil, may be cut off by the pair of IGBTs of the upper-arm switch during a shift from an energization state where a corresponding one of the lower-arm switches of the second inverter is turned on and off by the second energization controller to an energization state where a corresponding one of the upper-arm switches of the first inverter is turned on and off by the second energization controller.

With the above configuration, in the half-wave drive mode, during the shift between the half-wave energization of the first multi-phase coil by the first inverter and the half-wave energization of the second multi-phase coil by the second inverter, the first and second return current paths will be cut off respectively by the pairs of the IGBTs of the lower-arm switches of the first inverter and the upper-arm switches of the second inverter. Consequently, it will become possible to realize suitable commutation between the phase windings of the first multi-phase coil and the phase windings of the second multi-phase coil. As a result, it will become possible to suitably perform the half-wave energization of the first multi-phase coil and the half-wave energization of the second multi-phase coil in a complementary manner.

In addition, though each of the lower-arm switches of the first inverter and the upper-arm switches of the second inverter is configured with a pair of IGBTs connected in antiparallel to each other, the number of the switching elements placed in a conducting state (i.e., the number of serially-connected elements in each of the current conduction paths of the phase windings of the first and second multi-phase coils) in the half-wave drive mode is prevented from increasing. Consequently, it will be possible to suppress increase in the conduction loss along each of the current conduction paths in the half-wave drive mode.

Further, the first energization controller may be configured to: turn on and off, for each of the phase windings of the first multi-phase coil, the corresponding upper-arm switch of the first inverter and one of the pair of IGBTs of the corresponding lower-arm switch of the first inverter in a complementary manner while keeping the other of the pair of IGBTs of the corresponding lower-arm switch in an ON state; and turn on and off, for each of the phase windings of the second multi-phase coil, the corresponding lower-arm switch of the second inverter and one of the pair of IGBTs of the corresponding upper-arm switch of the second inverter in a complementary manner while keeping the other of the pair of IGBTs of the corresponding upper-arm switch in an ON state.

With the above energization control, it will be possible to enable the current return operation when the power factor is not equal to 1 or enable regenerative operation. Consequently, it will be possible to realize a more suitable full-wave drive of the rotating electric machine.

In addition, in the case of configuring each of the lower-arm switches of the first inverter and the upper-arm switches of the second inverter with a pair of IGBTs connected in antiparallel to each other, it will be possible to further reduce the number of serially-connected elements in a conducting state in each of the current conduction paths of the phase windings of the first and second multi-phase coils and thereby further reduce the conduction loss along each of the current conduction paths in the full-wave drive mode than in the case of configuring the same with a pair of semiconductor switching elements connected in series with each other and having respective flyback diodes oriented in opposite directions to each other.

In the drive apparatus according to the present disclosure, the number of turns of the first multi-phase coil may be set to be equal to the number of turns of the second multi-phase coil. The first and second multi-phase coils may be wound on the stator core so as to have each corresponding pair of one of the phase windings of the first multi-phase coil and one of the phase windings of the second multi-phase coil, which are of the same phase, received in same slots of the stator core.

With the above configuration, it will be possible to enhance the degree of magnetic coupling between the phase windings of the first multi-phase coil and the phase windings of the second multi-phase coil. Hence, it will be possible to reduce the commutation loss between the phase windings of the first multi-phase coil and the phase windings of the second multi-phase coil during the shift between the half-wave energization of the first multi-phase coil by the first inverter and the half-wave energization of the second multi-phase coil by the second inverter. As a result, it will be possible to increase the efficiency of driving the rotating electric machine in the half-wave drive mode.

Further, both the first and second multi-phase coils may be formed of electrical conductors having a rectangular cross-sectional shape. In this case, it will be possible to arrange the electrical conductors forming the first and second multi-phase coils in the slots of the stator core in an orderly manner. Consequently, it will be possible to suppress variation in the degree of magnetic coupling between the phase windings of the first multi-phase coil and the phase windings of the second multi-phase coil, thereby more effectively reducing the commutation loss therebetween.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, descriptions of identical components will not be repeated.

First Embodiment

Figure 2:
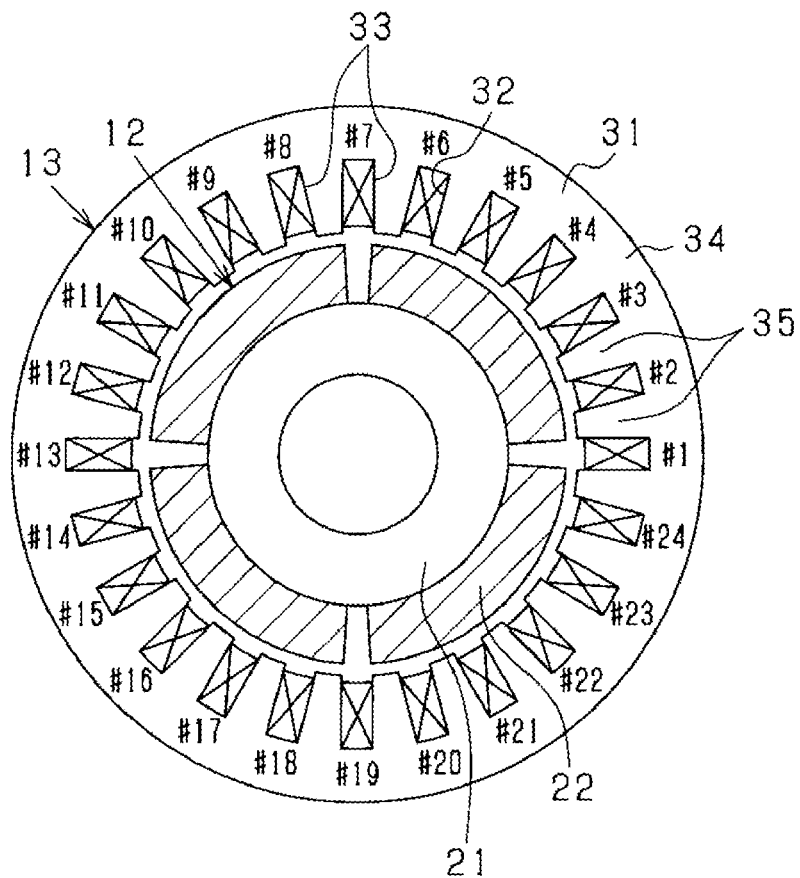
FIG. 2 is a transverse cross-sectional view of both a rotor and a stator of the rotating electric machine according to the first embodiment.

FIGS. 1 and 2 together show the configuration of a rotating electric machine 10 according to the first embodiment.

In the present embodiment, the rotating electric machine 10 is designed to be used as a mechanical power source in, for example, an electrically-driven vehicle. It should be noted that the rotating electric machine 10 may alternatively be used for other applications, such as industrial, marine, aviation, household, office automation and amusement applications.

More particularly, in the present embodiment, the rotating electric machine 10 is configured as an inner rotor type (i.e., inner rotating type) multi-phase AC motor.

FIG. 1 is a longitudinal cross-sectional view of the rotating electric machine 10 along a central axis of a rotating shaft 11 of the rotating electric machine 10. FIG. 2 is a transverse cross-sectional view of both a rotor 12 and a stator 13 of the rotating electric machine 10 along a plane perpendicular to the central axis of the rotating shaft 11.

Hereinafter, the direction in which the central axis of the rotating shaft 11 extends will be referred to as axial direction; the directions of extending radially from the central axis of the rotating shaft 11 will be referred to as radial directions; and the direction of extending along a circle whose center is on the central axis of the rotating shaft 11 will be referred to as circumferential direction.

The rotating electric machine 10 includes the rotating shaft 11, the rotor 12 fixed on the rotating shaft 11, the stator 13 provided at such a position as to surround the rotor 12, and a housing 14 that receives both the rotor 12 and the stator 13 therein. In addition, the rotor 12 and the stator 13 are arranged coaxially with each other.

The housing 14 has a substantially hollow cylindrical shape with both axial ends thereof closed. The housing 14 is composed of a pair of cup-shaped housing pieces 14a and 14b. The housing pieces 14a and 14b are fastened, for example by bolts 15, into one piece with open ends thereof opposed to each other. The housing 14 has a pair of bearings 16 and 17 provided respectively in opposite axial end walls thereof.

The rotating shaft 11 is rotatably supported by the housing 14 via the pair of bearings 16 and 17.

The rotor 12 is fixedly fitted on the rotating shaft 11 so as to rotate together with the rotating shaft 11. The rotor 12 includes a hollow cylindrical rotor core 21 and a plurality of permanent magnets 22 arranged on a radially outer periphery of the rotor core 21 (i.e., outer periphery of the rotor core 21 radially facing a radially inner periphery of the stator 13) in alignment with each other in the circumferential direction.

In the present embodiment, the rotor core 21 is formed by laminating a plurality of annular magnetic steel sheets in the axial direction and fixing them together by, for example, staking.

Moreover, in the present embodiment, the rotor 12 is configured as a four-pole SPM (Surface Permanent Magnet) rotor. That is, the permanent magnets 22 are arranged on the radially outer surface of the rotor core 21 to form a plurality (e.g., four in the present embodiment) of magnetic poles the polarities of which alternate between north and south in the circumferential direction. It should be noted that the rotor 12 may alternatively be configured as an IPM (Interior Permanent Magnet) rotor. In addition, the permanent magnets 22 may be implemented by rare-earth magnets or ferrite magnets.

The stator 13 includes an annular (or hollow cylindrical) stator core 31 having a plurality of slots 32 formed therein and a stator coil 33 wound on the stator core 31 so as to be received in the slots 32 of the stator core 31. The stator coil 33 consists of two three-phase symmetrical coils. That is, the stator coil 33 includes six phase windings (more specifically, U1-phase, V1-phase, W1-phase, U2-phase, V2-phase and W2-phase windings).

In the present embodiment, the stator core 31 is formed by laminating a plurality of annular magnetic steel sheets in the axial direction and fixing them together by, for example, staking. The stator core 31 includes an annular core 34 and a plurality of teeth 35 that each extend radially inward from the yoke 34 and are arranged at equal intervals in the circumferential direction. Each of the slots 32 is formed between one circumferentially-adjacent pair of the teeth 35.

Moreover, in the present embodiment, the rotating electric machine 10 has a four-pole, twenty-four-slot and six-phase structure. More specifically, the stator coil 33 consists of a first three-phase coil 33a and a second three-phase coil 33b (see FIG. 4). The first three-phase coil 33a is composed of the U1-phase, V1-phase, W1-phase windings that are Y-connected (i.e., star-connected) to define a first neutral point N1 therebetween. Similarly, the second three-phase coil 33b is composed of the U2-phase, V2-phase and W2-phase windings that are Y-connected to define a second neutral point N2 therebetween. In addition, in FIG. 2, the twenty-four slots 32 formed in the stator core 31 are sequentially numbered as #1, #2, . . . , and #24 in the counterclockwise direction.

Figure 3:
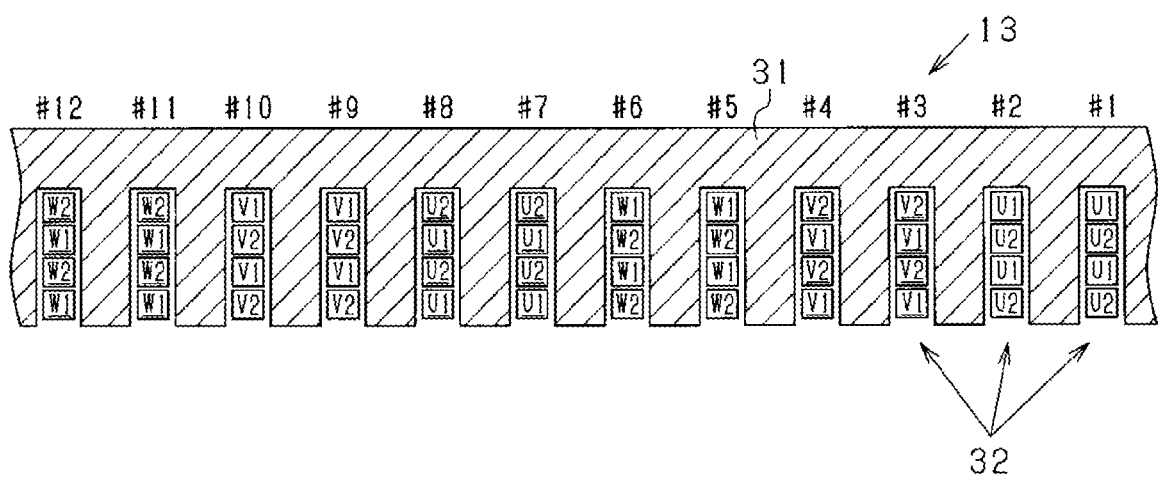
FIG. 3 is a developed view, in a circumferential direction, of part of the stator of the rotating electric machine according to the first embodiment.

As shown in FIG. 3, in the stator core 31, the slots 32 are provided in pairs. Each slot pair consists of two circumferentially adjacent slots 32 corresponding to one of the phase windings of each of the first and second three-phase coils 33a and 33b. Moreover, in each of the slots 32, there are inserted four electrical conductors forming the first and second three-phase coils 33a and 33b. More specifically, in each of the slots 32, there are received four electrical conductors forming the first and second three-phase coils 33a and 33b in radial alignment with each other such that the electrical conductors forming the first three-phase coil 33a are arranged alternately with the electrical conductors forming the second three-phase coil 33b in the radial direction.

Moreover, in the present embodiment, the number of turns of the first three-phase coil 33a and the number of turns of the second three-phase coil 33b are set to be equal to each other. Each corresponding pair of one of the phase windings of the first three-phase coil 33a and one of the phase windings of the second three-phase coil 33b, which are of the same phase, are received in the same slots 32 of the stator core 31. In addition, in the present embodiment, the first and second three-phase coils 33a and 33b are formed of rectangular electrical conductor wires (i.e., electrical conductors having a rectangular cross-sectional shape).

For example, as shown in FIG. 3, in each of the #1 and #2 slots 32, there are arranged four electrical conductors forming the U1-phase winding of the first three-phase coil 33a and the U2-phase winding of the second three-phase coil 33b from the radially inner side (i.e., from the rotor 12 side) in the order of U2→U1→U2→U1. In each of the #3 and #4 slots 32, there are arranged four electrical conductors forming the V1-phase winding of the first three-phase coil 33a and the V2-phase winding of the second three-phase coil 33b from the radially inner side in the order of V1→V2→V1→V2. In each of the #5 and #6 slots 32, there are arranged four electrical conductors forming the W1-phase winding of the first three-phase coil 33a and the W2-phase winding of the second three-phase coil 33b from the radially inner side in the order of W2→W1→W2→W1. In the above manner, in each of the slots 32 of the stator core 31, there are arranged the electrical conductors forming one corresponding pair of one of the phase windings of the first three-phase coil 33a and one of the phase windings of the second three-phase coil 33b in a state of being magnetically coupled with each other.

It should be noted that the number of poles of the rotor 12, the number of phases of the stator coil 33, the number of the slots 32 formed in the stator core 31 and the number of electrical conductors of the stator coil 33 received in each of the slots 32 are not limited to the above, provided that the first and second three-phase coils 33a and 33b can be wound on the stator core 31 to have each of the U1-phase, V1-phase, W1-phase windings of the first three-phase coil 33a magnetically coupled with a corresponding one of the U2-phase, V2-phase and W2-phase windings of the second three-phase coil 33b.

Next, the configuration of a control system for controlling (or drive apparatus for driving) the rotating electric machine 10 according to the present embodiment will be described with reference to FIG. 4.

In the present embodiment, the control system includes a first inverter 40 provided for energization of the first three-phase coil 33a and a second inverter 50 provided for energization of the second three-phase coil 33b.

Each of the first and second inverters 40 and 50 is configured with a full bridge circuit having a plurality of pairs of upper and lower arms. The number of pairs of the upper and lower arms is equal to the number of phases of each of the first and second three-phase coils 33a and 33b (i.e., three in the present embodiment). Each of the upper and lower arms has a switch (or semiconductor switching element) provided therein. In operation, electric current supplied to each of the phase windings of the first and second three-phase coils 33a and 33b is controlled by turning on and off the switches of the upper and lower arms.

Specifically, the first inverter 40 includes three switch pairs respectively corresponding to (or connected with) the U1-phase, V1-phase and W1-phase windings of the first three-phase coil 33a and each consisting of an upper-arm switch 41 and a lower-arm switch 42 that are connected in series with each other. Moreover, for each of the switch pairs, a high-potential-side terminal of the upper-arm switch 41 is connected to a positive terminal of a DC power supply 60; and a low-potential-side terminal of the lower-arm switch 42 is connected to a negative terminal of the DC power supply 60 (or grounded). Each of the upper-arm switches 41 of the first inverter 40 is configured with a semiconductor switching element (e.g., an IGBT) having a flyback diode (or freewheeling diode) 43 connected in antiparallel thereto; the flyback diode 43 has its cathode connected to the higher potential side and its anode connected to the lower potential side. Similarly, each of the lower-arm switches 42 of the first inverter 40 is configured with a semiconductor switching element (e.g., an IGBT) having a flyback diode 44 connected in antiparallel thereto; the flyback diode 44 has its cathode connected to the higher potential side and its anode connected to the lower potential side.

Moreover, the first inverter 40 also includes three first additional switches 45. Each of the U1-phase, V1-phase and W1-phase windings of the first three-phase coil 33a has a first end connected, via a corresponding one of the first additional switches 45, to an intermediate point between the upper-arm and lower-arm switches 41 and 42 of the corresponding switch pair of the first inverter 40. That is, each of the first additional switches 45 is provided in an AC line, which connects the intermediate point between the corresponding upper-arm and lower-arm switches 41 and 42 of the first inverter 40 and the corresponding one of the U1-phase, V1-phase and W1-phase windings of the first three-phase coil 33a, to selectively allow and block flow of electric current through the AC line. In addition, each of the first additional switches 45 of the first inverter 40 is configured with a semiconductor switching element (e.g., an IGBT) having a flyback diode 46 connected in antiparallel thereto; the flyback diode 46 has its cathode connected to the intermediate point between the corresponding upper-arm and lower-arm switches 41 and 42 of the first inverter 40 and its anode connected to the first end of the corresponding one of the U1-phase, V1-phase and W1-phase windings of the first three-phase coil 33a.

Furthermore, each of the U1-phase, V1-phase and W1-phase windings of the first three-phase coil 33a has a second end connected to the first neutral point N1. Further, the first neutral point N1 is connected to the lower potential side (or negative terminal) of the DC power supply 60 via an electrical path 47. In the electrical path 47, there is provided a first shift switch (or first neutral-point switch) 48 by which the first neutral point N1 is connected to and disconnected from the lower potential side of the DC power supply 60. In addition, the first shift switch 48 is configured with a semiconductor switching element (e.g., an IGBT) having a flyback diode 49 connected in antiparallel thereto; the flyback diode 49 has its cathode connected to the first neutral point N1 and its anode connected to the lower potential side of the DC power supply 60.

On the other hand, the second inverter 50 includes three switch pairs respectively corresponding to (or connected with) the U2-phase, V2-phase and W2-phase windings of the second three-phase coil 33b and each consisting of an upper-arm switch 51 and a lower-arm switch 52 that are connected in series with each other. Moreover, for each of the switch pairs, a high-potential-side terminal of the upper-arm switch 51 is connected to the positive terminal of the DC power supply 60; and a low-potential-side terminal of the lower-arm switch 52 is connected to the negative terminal of the DC power supply 60 (or grounded). Each of the upper-arm switches 51 of the second inverter 50 is configured with a semiconductor switching element (e.g., an IGBT) having a flyback diode (or freewheeling diode) 53 connected in antiparallel thereto; the flyback diode 53 has its cathode connected to the higher potential side and its anode connected to the lower potential side. Similarly, each of the lower-arm switches 52 of the second inverter 50 is configured with a semiconductor switching element (e.g., an IGBT) having a flyback diode 54 connected in antiparallel thereto; the flyback diode 54 has its cathode connected to the higher potential side and its anode connected to the lower potential side.

Moreover, the second inverter 50 also includes three second additional switches 55. Each of the U2-phase, V2-phase and W2-phase windings of the second three-phase coil 33b has a first end connected, via a corresponding one of the second additional switches 55, to an intermediate point between the upper-arm and lower-arm switches 51 and 52 of the corresponding switch pair of the second inverter 50. That is, each of the second additional switches 55 is provided in an AC line, which connects the intermediate point between the corresponding upper-arm and lower-arm switches 51 and 52 of the second inverter 50 and the corresponding one of the U2-phase, V2-phase and W2-phase windings of the second three-phase coil 33b, to selectively allow and block flow of electric current through the AC line. In addition, each of the second additional switches 55 of the second inverter 50 is configured with a semiconductor switching element (e.g., an IGBT) having a flyback diode 56 connected in antiparallel thereto; the flyback diode 56 has its anode connected to the intermediate point between the corresponding upper-arm and lower-arm switches 51 and 52 of the second inverter 50 and its cathode connected to the first end of the corresponding one of the U2-phase, V2-phase and W2-phase windings of the second three-phase coil 33b.

Furthermore, each of the U2-phase, V2-phase and W2-phase windings of the second three-phase coil 33b has a second end connected to the second neutral point N2.

Further, the second neutral point N2 is connected to the higher potential side (or positive terminal) of the DC power supply 60 via an electrical path 57. In the electrical path 57, there is provided a second shift switch (or second neutral-point switch) 58 by which the second neutral point N2 is connected to and disconnected from the higher potential side of the DC power supply 60. In addition, the second shift switch 58 is configured with a semiconductor switching element (e.g., an IGBT) having a flyback diode 59 connected in antiparallel thereto; the flyback diode 59 has its anode connected to the second neutral point N2 and its cathode connected to the higher potential side of the DC power supply 60.

The controller 65 is configured with a microcomputer which includes a CPU (Central Processing Unit) and various memories. The controller 65 controls, based on various types of information detected in the rotating electric machine 10 and a power running drive request (or torque generation request) or an electric power generation request, the open/closed states (or ON/OFF states) of the switches of the first and second inverters 40 and 50, thereby controlling energization of the first and second three-phase coils 33a and 33b. The various types of information detected in the rotating electric machine 10 include, for example, the rotation angle (or electrical angle information) of the rotor 12 detected by a rotation angle sensor such as a resolver, the output voltage of the DC power supply 60 (or the input voltage of the first and second inverters 40 and 50) detected by a voltage sensor, and the electric currents supplied to the first and second three-phase coils 33a and 33b detected by at least one current sensor. In addition, the at least one current sensor may be provided for each of the first and second inverters 40 and 50 or shared by the first and second inverters 40 and 50. The controller 65 generates operation signals for operating the switches of the first and second inverters 40 and 50 and outputs the generated operation signals to the first and second inverters 40 and 50.

In the present embodiment, energization of the first three-phase coil 33a and energization of the second three-phase coil 33b are controlled respectively by the first inverter 40 and the second inverter 50. Moreover, drive of the rotating electric machine 10 is controlled in a full-wave drive mode with both the first and second shift switches 48 and 58 kept in the open state (or OFF state) and in a half-wave drive mode with both the first and second shift switches 48 and 58 kept in the closed state (or ON state). That is, the drive mode of the rotating electric machine 10 is shifted (or switched) between the full-wave drive mode and the half-wave drive mode by switching both the first and second shift switches 48 and 58 between the open state and the closed state. In addition, in the present embodiment, the controller 65 constitutes both a first energization controller and a second energization controller.

Figure 5:
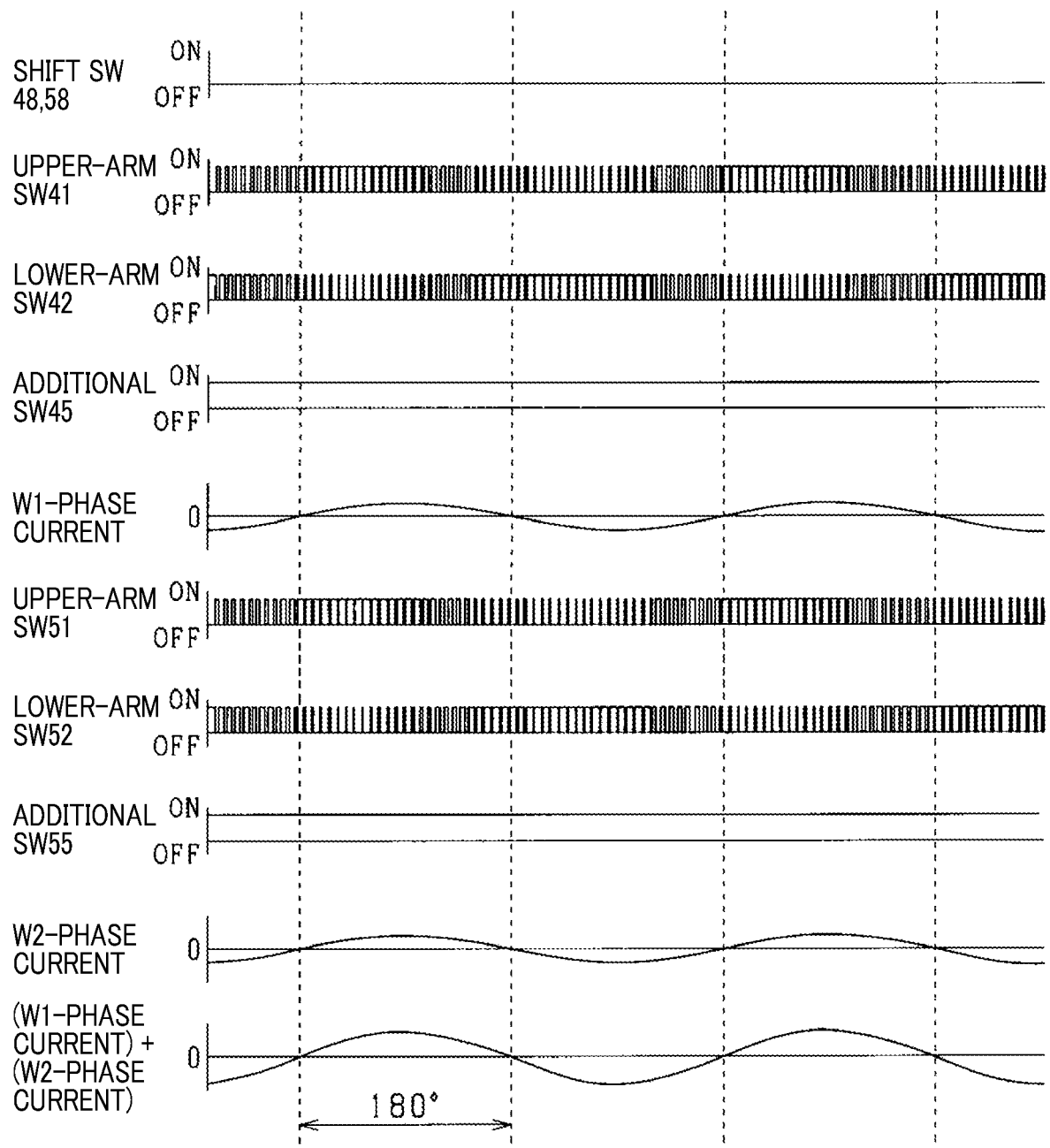
FIG. 5 is a time chart illustrating operation of the control system for driving the rotating electric machine in a full-wave drive mode.

FIG. 5 illustrates the ON/OFF states of the switches of the first and second inverters 40 and 50 in the full-wave drive mode of the rotating electric machine 10. On the other hand, FIG. 6 illustrates the ON/OFF states of the switches of the first and second inverters 40 and 50 in the half-wave drive mode of the rotating electric machine 10.

Figure 6:
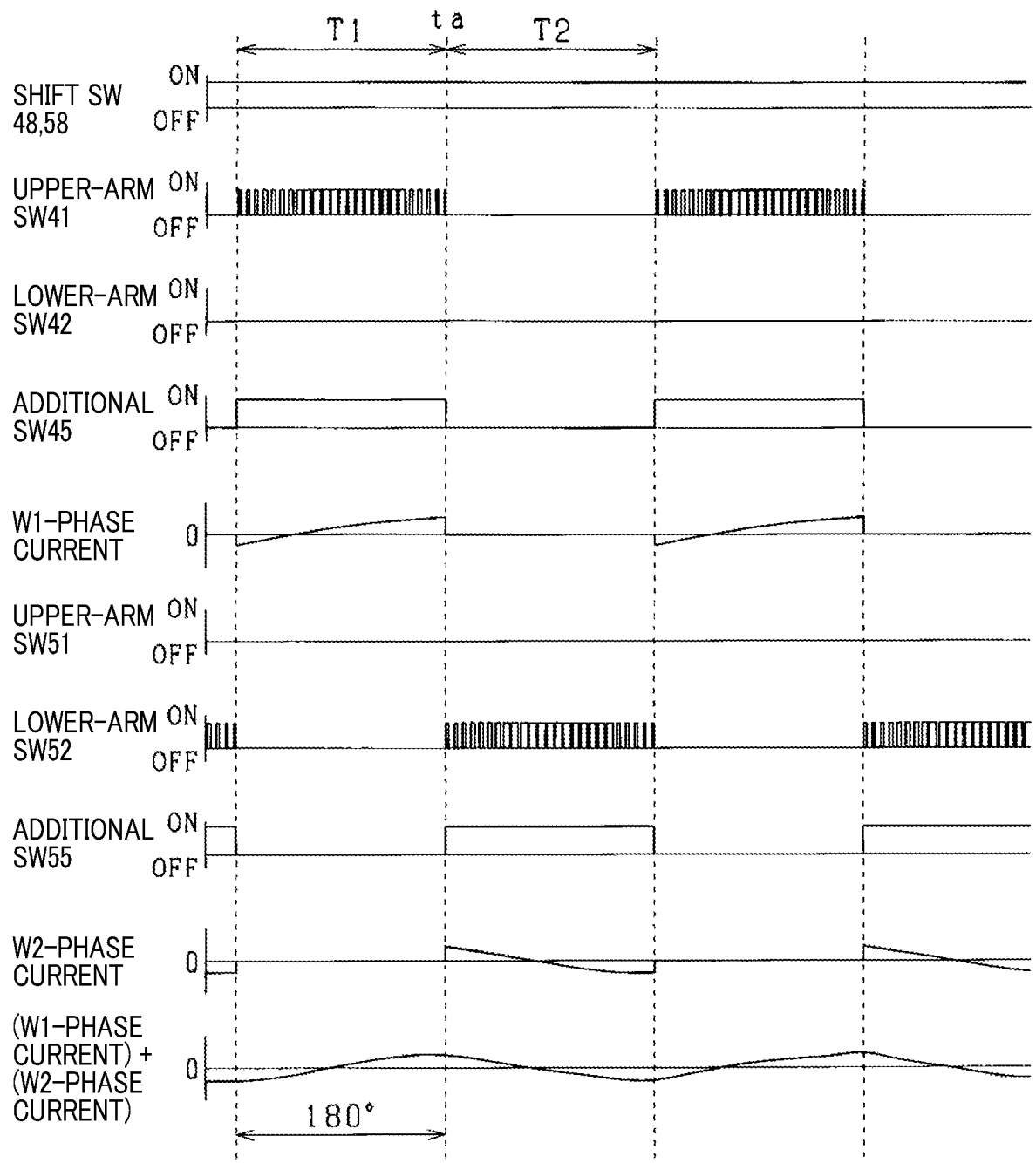
FIG. 6 is a time chart illustrating operation of the control system for driving the rotating electric machine in a half-wave drive mode.

In addition, in FIGS. 5 and 6, there are shown only the ON/OFF states of the switches corresponding to the W1-phase winding of the first three-phase coil 33a and the W2-phase winding of the second three-phase coil 33b. However, it should be noted that the switches corresponding to the U1-phase and V1-phase windings of the first three-phase coil 33a and the U2-phase and V2-phase windings of the second three-phase coil 33b are operated in the same manner as the switches corresponding to the W1-phase winding and the W2-phase winding except that the U1-phase, V1-phase and W1-phase currents are offset from each other by 120° in electrical angle and the U2-phase, V2-phase and W2-phase currents are offset from each other by 120° in electrical angle.

As shown in FIG. 5, in the full-wave drive mode of the rotating electric machine 10, both the first and second shift switches 48 and 58 are kept in the OFF state and all of the first and second additional switches 45 and 55 of the first and second inverters 40 and 50 are kept in the ON state. Moreover, for each of the U1-phase, V1-phase and W1-phase windings of the first three-phase coil 33a, the upper-arm and lower-arm switches 41 and 42 of the first inverter 40 corresponding to (i.e., connected with) the phase winding are turned on and off in a complementary manner, thereby controlling energization of the phase winding. Similarly, for each of the U2-phase, V2-phase and W2-phase windings of the second three-phase coil 33b, the upper-arm and lower-arm switches 51 and 52 of the second inverter 50 corresponding to (i.e., connected with) the phase winding are turned on and off in a complementary manner, thereby controlling energization of the phase winding. That is, in the full-wave drive mode, the upper-arm and lower-arm switches of each of the switch pairs of the first and second inverters 40 and 50 are turned on and off in a complementary manner for the same energization period, thereby controlling energization of the first and second three-phase coils 33a and 33b.

With the above energization control in the full-wave drive mode, the W1-phase current and the W2-phase current, which are in phase with each other as shown in FIG. 5, flow respectively through the W1-phase winding of the first three-phase coil 33a and the W2-phase winding of the second three-phase coil 33b which are of the same phase. Consequently, the rotating electric machine 10 are driven with the resultant current [W1-phase current+W2-phase current]. That is, since the energization control is performed on each corresponding pair of one of the phase windings of the first three-phase coil 33a and one of the phase windings of the second three-phase coil 33b, which are of the same phase, for the same energization period, the stator coil 33 is energized with full-wave, three-phase alternating current. Consequently, it becomes possible for the rotating electric machine 10 to output high torque.

In contrast, as shown in FIG. 6, in the half-wave drive mode of the rotating electric machine 10, both the first and second shift switches 48 and 58 are kept in the ON state and each corresponding pair of one of the first additional switches 45 of the first inverter 40 and one of the second additional switches 55 of the second inverter 50 are alternately turned on for periods of 180° (or electrical half-cycles). Moreover, during the ON periods of each of the first additional switches 45 of the first inverter 40, the corresponding upper-arm switch 41 of the first inverter 40 is repeatedly turned on and off. Similarly, during the ON periods of each of the second additional switches 55 of the second inverter 50, the corresponding lower-arm switch 52 of the second inverter 50 is repeatedly turned on and off.

Specifically, for a time period T1, the first additional switch 45 of the first inverter 40 connected with the W1-phase winding of the first three-phase coil 33a is kept in the ON state while the second additional switch 55 of the second inverter 50 connected with the W2-phase winding of the second three-phase coil 33b is kept in the OFF state. Moreover, for the time period T1, the corresponding upper-arm switch 41 of the first inverter 40 (i.e., the upper-arm switch 41 connected with the W1-phase winding via the corresponding first additional switch 45) is repeatedly turned on and off (or switched) while the corresponding lower-arm switch 42 of the first inverter 40 (i.e., the lower-arm switch 42 connected with the W1-phase winding via the first additional switch 45) is kept in the OFF state. Furthermore, for the time period T1, both the corresponding upper-arm and lower-arm switches 51 and 52 of the second inverter 50 (i.e., both the upper-arm and lower-arm switches 51 and 52 connected with the W2-phase winding via the second additional switch 55) are kept in the OFF state.

Further, for a time period T2 subsequent to the time period T1, the first additional switch 45 of the first inverter 40 connected with the W1-phase winding of the first three-phase coil 33*a* is kept in the OFF state while the second additional switch 55 of the second inverter 50 connected with the W2-phase winding of the second three-phase coil 33*b* is kept in the ON state. Moreover, for the time period T2, both the corresponding upper-arm and lower-arm switches 41 and 42 of the first inverter 40 are kept in the OFF state. Furthermore, for the time period T2, the corresponding upper-arm switch 51 of the second inverter 50 is kept in the OFF state while the corresponding lower-arm switch 52 of the second inverter 50 is repeatedly turned on and off (or switched).

That is, in the half-wave drive mode, with the first and second shift switches 48 and 58 kept in the closed state (i.e., ON state), for each corresponding pair of one of the phase windings of the first three-phase coil 33*a* and one of the phase windings of the second three-phase coil 33*b*, the upper-arm switch 41 of the first inverter 40 corresponding to the phase winding of the first three-phase coil 33*a* and the lower-arm switch 52 of the second inverter 50 corresponding to the phase winding of the second three-phase coil 33*b* are turned on and off respectively for first energization periods and second energization periods, thereby controlling energization of the first and second three-phase coils 33*a* and 33*b*. The first energization periods are set alternately with the second energization periods.

With the above energization control in the half-wave drive mode, the half-wave drive of the rotating electric machine 10 by the first inverter 40 is performed alternately with the half-wave drive of the rotating electric machine 10 by the second inverter 50. Moreover, in the half-wave drive mode, the first neutral point N1 between the U1-phase, V1-phase and W1-phase windings of the first three-phase coil 33*a* is short-circuited to the lower potential side of the DC power supply 60 by the first shift switch 48 while the second neutral terminal N2 between the U2-phase, V2-phase and W2-phase windings of the second three-phase coil 33*b* is short-circuited to the higher potential side of the DC power supply 60 by the second shift switch 58. Consequently, for each corresponding pair of one of the phase windings of the first three-phase coil 33*a* and one of the phase windings of the second three-phase coil 33*b*, the polarities of the phase currents flowing respectively through the phase winding of the first three-phase coil 33*a* and the phase winding of the second three-phase coil 33*b* change in opposite directions to each other in the consecutive first and second energization periods. Moreover, since the first energization periods are set alternately with the second energization periods, the resultant magnetomotive force is in the form of a full wave.

Specifically, as shown in FIG. 6, for the time period T1 (i.e., first energization period), the polarity of the W1-phase current is changed such that the W1-phase current is first a negative current and then becomes a positive current. In contrast, for the time period T2 (i.e., second energization period) subsequent to the time period T1, the polarity of the W2-phase current is changed such that the W2-phase current is first a positive current and then becomes a negative current. Consequently, though the rotating electric machine 10 is driven in the half-wave drive mode, the waveform of the resultant current of the W1-phase current and the W2-phase current becomes substantially identical to the waveform of a sine wave. As a result, it becomes possible to obtain a sinusoidal rotating magnetic field (or magnetomotive force) as in the full-wave drive mode.

Figure 7:
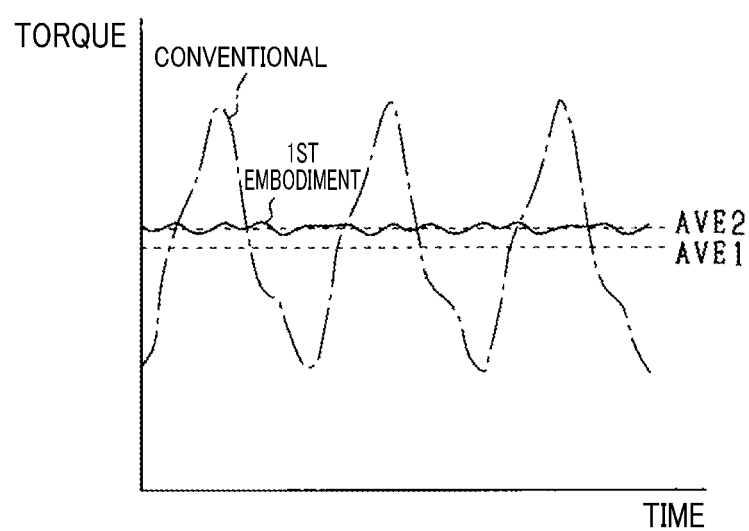
FIG. 7 is a time chart illustrating both the change with time of torque of the rotating electric machine according to the first embodiment and the change with time of torque of a conventional rotating electric machine.

FIG. 7 shows both the change with time of the torque of the rotating electric machine 10 according to the present embodiment and the change with time of the torque of a conventional rotating electric machine. Specifically, in FIG. 7, the change with time of the torque of the rotating electric machine 10 according to the present embodiment is shown with a solid line whereas the change with time of the torque of the conventional rotating electric machine is shown with a chain line. From FIG. 7, it can be seen that: the torque ripple of the rotating electric machine 10 according to the present embodiment is lower than the torque ripple of the conventional rotating electric machine; and the average torque AVE2 of the rotating electric machine 10 according to the present embodiment is higher than the average torque AVE1 of the conventional rotating electric machine. In the present embodiment, during the shift (or switching) between the half-wave drive by the first inverter 40 and the half-wave drive by the second inverter 50, commutation is caused by magnetic induction to take place between each magnetically-coupled pair of the phase windings of the first and second three-phase coils 33*a* and 33*b*. Hereinafter, the commutation will be described in detail by taking the magnetically-coupled pair of the W1-phase winding of the first three-phase coil 33*a* and the W2-phase winding of the second three-phase coil 33*b* as an example.

Referring again to FIG. 6, for the time period T1, the corresponding first additional switch 45 is kept in the ON state and the corresponding upper-arm switch 41 of the first inverter 40 is repeatedly turned on and off, thereby causing positive half-wave current (i.e., the W1-phase current) to flow through the W1-phase winding to the first neutral point N1 of the first three-phase coil 33*a*.

Then, at a timing ta, both the corresponding first additional switch 45 and the corresponding upper-arm switch 41 are turned off, thereby interrupting the W1-phase current. The interruption of the W1-phase current induces a voltage in the W1-phase winding of the first three-phase coil 33*a* and the W2-phase winding of the second three-phase coil 33*b* in a direction to impede the change in the W1-phase current. Consequently, in the second three-phase coil 33*b* and the second inverter 50, a current path is formed along which electric current flows through the W2-phase winding→the second shift switch 58→the DC power supply 60→the flyback diode 54 of the corresponding lower-arm switch 52→the flyback diode 53 of the corresponding upper-arm switch 51→the W2-phase winding. As a result, the electric current flowing in the W1-phase winding of the first three-phase current 33*a* is commutated to the W2-phase winding of the second three-phase current 33*b*.

For the time period T2 immediately after the timing ta, the corresponding second additional switch 55 is kept in the ON state and the corresponding lower-arm switch 52 of the second inverter 50 is repeatedly turned on and off, thereby causing negative half-wave current (i.e., the W2-phase current) to flow through the W2-phase winding of the second three-phase coil 33*b*.

At the end of the time period T2, commutation from the W2-phase winding of the second three-phase current 33b to the W1-phase winding of the first three-phase current 33a takes place in a similar manner to the above-described commutation from the W1-phase winding to the W2-phase winding. The commutation from the W2-phase winding to the W1-phase winding differs from the above-described commutation from the W1-phase winding to the W2-phase winding in that: for the time period T2, the negative half-wave current (i.e., the W2-phase current) flows from the second neutral point N2 of the second three-phase coil 33b to the corresponding lower-arm switch 52 of the second inverter 50 via the corresponding second additional switch 55.

Figure 8:
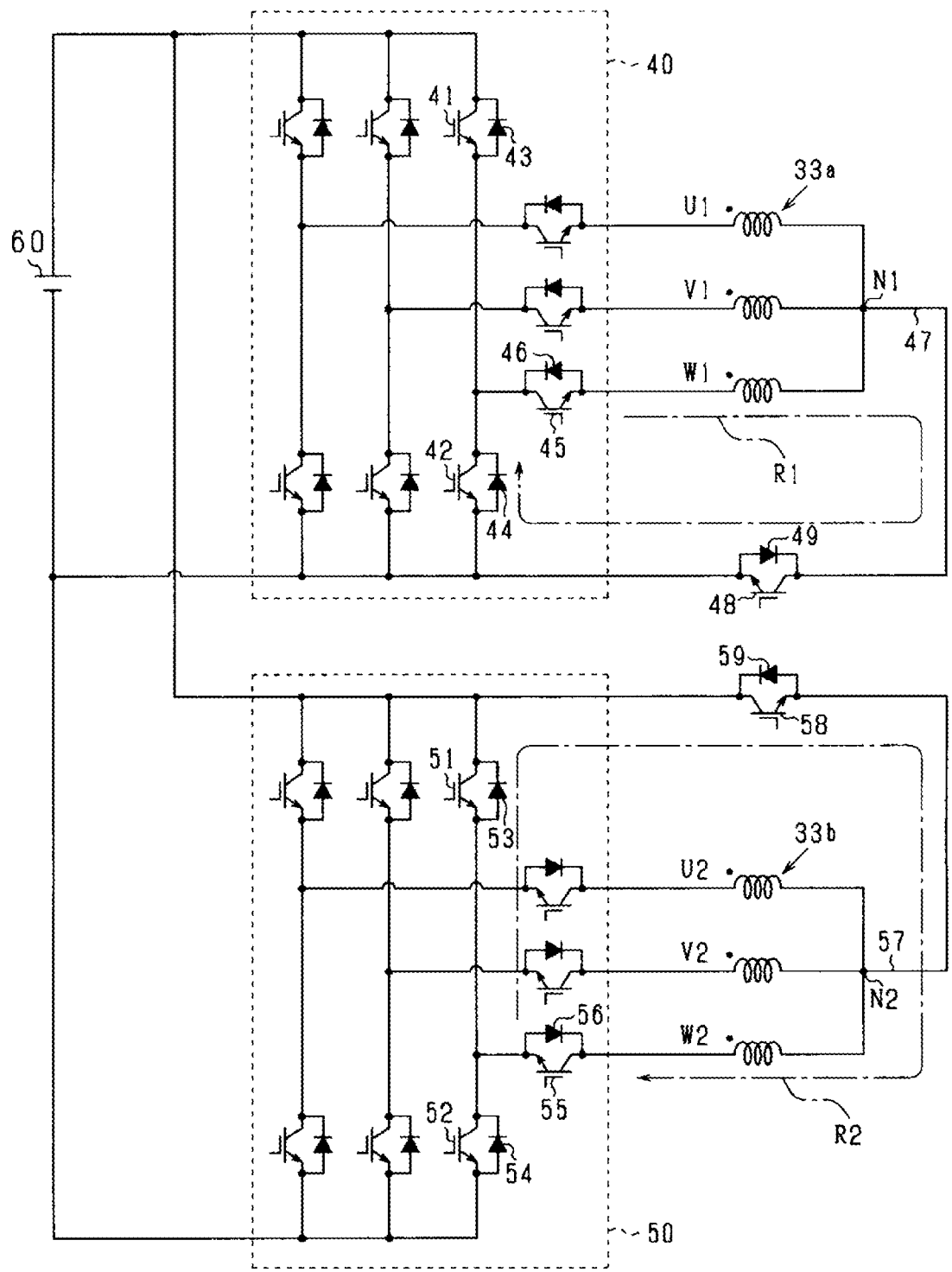
FIG. 8 is a schematic circuit diagram illustrating return current paths formed in first and second inverters of the control system.

Moreover, in the present embodiment, upon the interruption of the W1-phase current, a first return current path R1 is formed in the first inverter 40. As shown in FIG. 8, the first return current path R1 includes the W1-phase winding of the first three-phase coil 33a and the flyback diode 44 of the corresponding lower-arm switch 42 of the first inverter 40. The first return current path R1 may affect the commutation from the W1-phase winding to the W2-phase winding of the second three-phase coil 33b. Similarly, upon the interruption of the W2-phase current, a second return current path R2 is formed in the second inverter 50. As shown in FIG. 8, the second return current path R2 includes the W2-phase winding of the second three-phase coil 33b and the flyback diode 53 of the corresponding upper-arm switch 51 of the second inverter 50. The second return current path R2 may affect the commutation from the W2-phase winding to the W1-phase winding of the first three-phase current 33a.

In this regard, in the present embodiment, when the switching of the corresponding upper-arm switch 41 of the first inverter 40 is stopped and the switching of the corresponding lower-arm switch 52 of the second inverter 50 starts, the corresponding first additional switch 45 is turned off, thereby cutting off the first return current path R1. Consequently, it becomes possible to prevent the commutation from the W1-phase winding of the first three-phase coil 33a to the W2-phase winding of the second three-phase coil 33b from being affected by the first return current path R1. Similarly, when the switching of the corresponding lower-arm switch 52 of the second inverter 50 is stopped and the switching of the corresponding upper-arm switch 41 of the first inverter 40 starts, the corresponding second additional switch 55 is turned off, thereby cutting off the second return current path R2. Consequently, it becomes possible to prevent the commutation from the W2-phase winding of the second three-phase coil 33b to the W1-phase winding of the first three-phase coil 33a from being affected by the second return current path R2. In addition, in the present embodiment, each of the first additional switches 45 of the first inverter 40 corresponds to a "first cut-off switch" while each of the second additional switches 55 of the second inverter 50 corresponds to a "second cut-off switch".

Moreover, in the present embodiment, in the first inverter 40, each corresponding pair of one of the lower-arm switches 42 and one of the first additional switches 45 are serially connected such that the flyback diode 44 of the lower-arm switch 42 and the flyback diode 46 of the first additional switch 45 are oriented in opposite directions to each other. Consequently, each corresponding pair of one of the lower-arm switches 42 and one of the first additional switches 45 together constitute a bidirectional switch capable of bidirectionally conducting and bidirectionally blocking electric current. Similarly, in the second inverter 50, each corresponding pair of one of the upper-arm switches 51 and one of the second additional switches 55 are serially connected such that the flyback diode 53 of the upper-arm switch 51 and the flyback diode 56 of the second additional switch 55 are oriented in opposite directions to each other. Consequently, each corresponding pair of one of the upper-arm switches 51 and one of the second additional switches 55 together constitute a bidirectional switch capable of bidirectionally conducting and bidirectionally blocking electric current.

In the present embodiment, the controller 65 shifts (or switches), based on the rotational speed of the rotating electric machine 10, the drive mode of the rotating electric machine 10 between the full-wave drive mode and the half-wave drive mode. Specifically, in a first operation region on the lower rotational speed side, the controller 65 controls energization of the first and second three-phase coils 33a and 33b in the full-wave drive mode with both the first and second shift switches 48 and 58 kept in the OFF state (or open state). On the other hand, in a second operation region on the higher rotational speed side, the controller 65 controls energization of the first and second three-phase coils 33a and 33b in the half-wave drive mode with both the first and second shift switches 48 and 58 kept in the ON state (or closed state).

Figure 9:
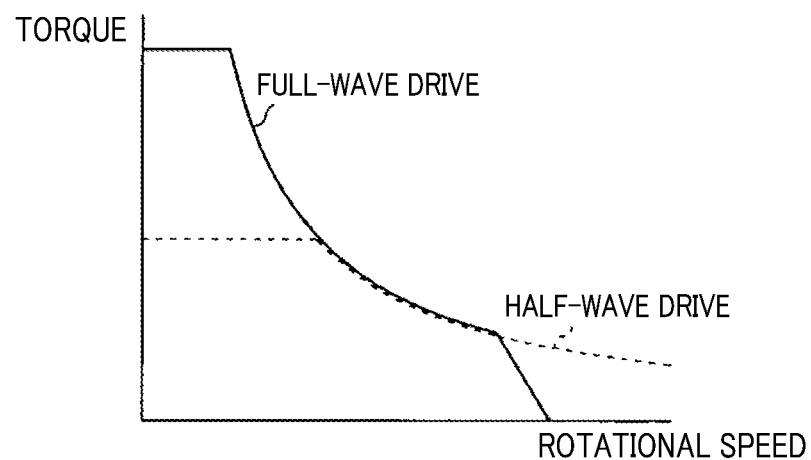
FIG. 9 is a graphical representation illustrating the output characteristics of the rotating electric machine according to the first embodiment both when the machine is driven in the full-wave drive mode and when the machine is driven in the half-wave drive mode.

In FIG. 9, the output characteristics of the rotating electric machine 10 in the full-wave drive mode are shown with a solid line; and the output characteristics of the rotating electric machine 10 in the half-wave drive mode are shown with a dashed line. The magnetomotive force in the full-wave drive mode is twice that in the half-wave drive mode; therefore, the full-wave drive mode is more suitable than the half-wave drive mod for high-torque operation. On the other hand, the applied voltage per unit winding in the half-wave drive mode is twice that in the full-wave drive mode; therefore, the half-wave drive mode is more suitable than the full-wave drive mode for high-speed operation. As seen from FIG. 9, the output characteristics of the rotating electric machine 10 in the full-wave drive mode and the output characteristics of the rotating electric machine 10 in the half-wave drive mode partially overlap each other.

Figure 10:
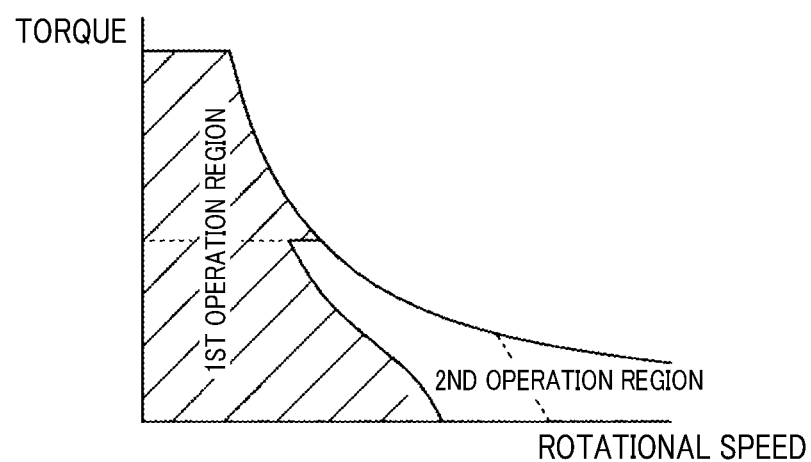
FIG. 10 is a graphical representation illustrating both first and second operation regions where the rotating electric machine according to the first embodiment is driven respectively in the full-wave and half-wave drive modes.

Therefore, in the present embodiment, the first operation region where the rotating electric machine 10 is driven in the full-wave drive mode and the second operation region where the rotating electric machine 10 is driven in the half-wave drive mode are set as shown in FIG. 10. Specifically, the first operation region is set to be on the lower rotational speed side, whereas the second operation region is set to be on the higher rotational speed side. In addition, for the sake of facilitating understanding, the first operation region is hatched in FIG. 10.

Figure 11:
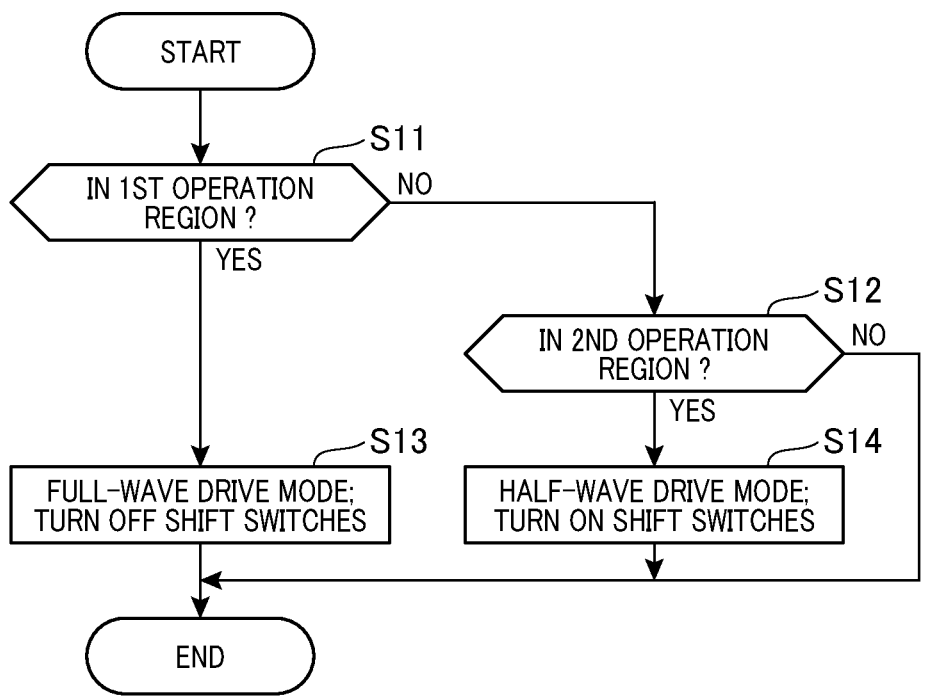
FIG. 11 is a flowchart illustrating a process of shifting the drive mode of the rotating electric machine according to the first embodiment between the full-wave and half-wave drive modes.

Next, a process of shifting the drive mode of the rotating electric machine 10 between the full-wave drive mode and the half-wave drive mode will be described with reference to FIG. 11. This process is repeatedly performed by the controller 65 in a predetermined cycle.

First, in step S11, a determination is made as to whether the rotating electric machine 10 is operating in the first operation region. Further, in step S12, a determination is made as to whether the rotating electric machine 10 is operating in the second operation region. In addition, the determinations in steps S11 and S12 may be made based on, for example, both the rotational speed calculated based on the rotation angle of the rotor 12 detected by the rotation angle sensor and the requested torque to the rotating electric machine 10.

If the rotating electric machine 10 is operating in the first operation region, i.e., if the determination in step S11 results in a "YES" answer, then the process proceeds to step S13. Otherwise, if the determination in step S11 results in a "NO" answer, then the process proceeds to step S12.

In step S13, the controller 65 sets the drive mode of the rotating electric machine 10 to the full-wave drive mode. Then, the process terminates.

Specifically, in step S13, both the first and second shift switches 48 and 58 are turned off. Then, with the first and second additional switches 45 and 55 kept in the ON state, the upper-arm and lower switches 41-42 and 51-52 of the first and second inverters 40 and 50 are turned on and off (or switched), thereby driving the rotating electric machine 10 in the full-wave drive mode.

In contrast, if the rotating electric machine 10 is operating in the second operation region, i.e., if the determination in step S12 results in a "YES" answer, then the process proceeds to step S14. Otherwise, if the determination in step S12 results in a "NO" answer, then the process terminates.

In step S14, the controller 65 sets the drive mode of the rotating electric machine 10 to the half-wave drive mode. Then, the process terminates.

Specifically, in step S14, both the first and second shift switches 48 and 58 are turned on. Then, each corresponding pair of one of the first additional switches 45 of the first inverter 40 and one of the second additional switches 55 of the second inverter 50 are alternately turned on for periods of 180° (or electrical half-cycles). Moreover, during the ON periods of each of the first additional switches 45 of the first inverter 40, the corresponding upper-arm switch 41 of the first inverter 40 is repeatedly turned on and off. Similarly, during the ON periods of each of the second additional switches 55 of the second inverter 50, the corresponding lower-arm switch 52 of the second inverter 50 is repeatedly turned on and off. Consequently, the rotating electric machine 10 is driven in the half-wave drive mode.

According to the present embodiment, it is possible to achieve the following advantageous effects.

In the present embodiment, in the full-wave drive mode, both the first and second shift switches 48 and 58 are kept in the OFF state (or open state) and full-wave energization of the first and second three-phase coils 33a and 33b is performed by the first and second inverters 40 and 50. In this case, the energization control is performed on each corresponding pair of one of the phase windings of the first three-phase coil 33a and one of the phase windings of the second three-phase coil 33b, which are of the same phase, for the same energization period. Consequently, it becomes possible for the rotating electric machine 10 to output high torque.

In contrast, in the half-wave drive mode, both the first and second shift switches 48 and 58 are kept in the ON state (or closed state) and half-wave energization of the first and second three-phase coils 33a and 33b is performed by the first and second inverters 40 and 50. In this case, each corresponding pair of one of the phase windings of the first three-phase coil 33a and one of the phase windings of the second three-phase coil 33b are magnetically coupled with each other on the stator core 31. Moreover, the first neutral point N1 of the first three-phase coil 33a is short-circuited to the lower potential side of the DC power supply 60 by the first shift switch 48 while the second neutral terminal N2 of the second three-phase coil 33b is short-circuited to the higher potential side of the DC power supply 60 by the second shift switch 58. Consequently, for each corresponding pair of one of the phase windings of the first three-phase coil 33a and one of the phase windings of the second three-phase coil 33b, the polarities of the phase currents flowing respectively through the phase winding of the first three-phase coil 33a and the phase winding of the second three-phase coil 33b change in opposite directions to each other in the consecutive first and second energization periods. Moreover, since the first energization periods are set alternately with the second energization periods, the resultant magnetomotive force is in the form of a full wave. Consequently, though the rotating electric machine 10 is driven in the half-wave drive mode, it still becomes possible to obtain a sinusoidal rotating magnetic field as in the full-wave drive mode. As a result, it becomes possible to reduce torque ripple of the rotating electric machine 10 in the half-wave drive mode.

As above, according to the present embodiment, it becomes possible to suitably drive the rotating electric machine 10 selectively in the full-wave and half-wave drive modes while reducing torque ripple of the rotating electric machine 10 in the half-wave drive mode.

Moreover, in the present embodiment, the first and second shift switches 48 and 58 are kept in the ON state or the OFF state depending on whether the rotating electric machine 10 operates in the first operation region or the second operation region. Consequently, it becomes possible to suitably obtain different output characteristics of the rotating electric machine 10 in the first and second operation regions. As a result, it becomes possible to extend the high-efficiency operation region of the rotating electric machine 10. Moreover, the applied voltage per unit winding in the half-wave drive mode is twice that in the full-wave drive mode. Consequently, it becomes possible to extend the operation region of the rotating electric machine 10 to the higher rotational speed side (i.e., the second operation region).

In the present embodiment, in the half-wave drive mode, during the shift (or switching) between the half-wave energization of the first three-phase coil 33a by the first inverter 40 and the half-wave energization of the second three-phase coil 33b by the second inverter 50, the return current paths R1 and R2, each of which includes the flyback diode of a corresponding one of the upper-arm and lower-arm switches of the first and second inverters 40 and 50 and a corresponding one of the phase windings of the first and second three-phase coils 33a and 33b, are cut off respectively by the first and second additional switches 45 and 55. Consequently, it becomes possible to realize suitable commutation between the phase windings of the first three-phase coil 33a and the phase windings of the second three-phase coil 33b. As a result, it becomes possible to suitably perform the half-wave energization of the first three-phase coil 33a and the half-wave energization of the second three-phase coil 33b in a complementary manner.

More particularly, in the present embodiment, each of the first and second additional switches 45 and 55 is provided in the AC line, which connects the intermediate point between the upper-arm and lower switches of the corresponding one of the switch pairs of the first and second inverters 40 and 50 and the corresponding one of the phase windings of the first and second three-phase coils 33a and 33b, to selectively allow and block flow of electric current through the AC line. Consequently, it becomes possible to suitably cut off, during the shift between the half-wave energization of the first three-phase coil 33a by the first inverter 40 and the half-wave energization of the second three-phase coil 33b by the second inverter 50, the return current paths R1 and R2 respectively by the first and second additional switches 45 and 55.

In the present embodiment, the number of turns of the first three-phase coil 33a and the number of turns of the second three-phase coil 33b are set to be equal to each other. Each corresponding pair of one of the phase windings of the first three-phase coil 33a and one of the phase windings of the second three-phase coil 33b, which are of the same phase, are received in the same slots 32 of the stator core 31. Consequently, it becomes possible to enhance the degree of magnetic coupling between the phase windings of the first three-phase coil 33a and the phase windings of the second three-phase coil 33b. Hence, it becomes possible to reduce the commutation loss between the phase windings of the first three-phase coil 33a and the phase windings of the second three-phase coil 33b during the shift between the half-wave energization of the first three-phase coil 33a by the first inverter 40 and the half-wave energization of the second three-phase coil 33b by the second inverter 50. As a result, it becomes possible to increase the efficiency of driving the rotating electric machine 10 in the half-wave drive mode.

In the present embodiment, both the first and second three-phase coils 33a and 33b are formed of electrical conductors having a rectangular cross-sectional shape. Consequently, it becomes possible to arrange the electrical conductors forming the first and second three-phase coils 33a and 33b in the slots 32 of the stator core 31 in an orderly manner. As a result, it becomes possible to suppress variation in the degree of magnetic coupling between the phase windings of the first three-phase coil 33a and the phase windings of the second three-phase coil 33b, thereby more effectively reducing the commutation loss therebetween.

In the present embodiment, the rotating electric machine 10 includes the pair of first and second three-phase coils 33a and 33b. Moreover, the control system includes the pair of first and second inverters 40 and 50 for respectively energizing the pair of first and second three-phase coils 33a and 33b. Consequently, it becomes possible to make the drive system (or control system) redundant, thereby improving the reliability of the drive system.

Second Embodiment

Figure 12:
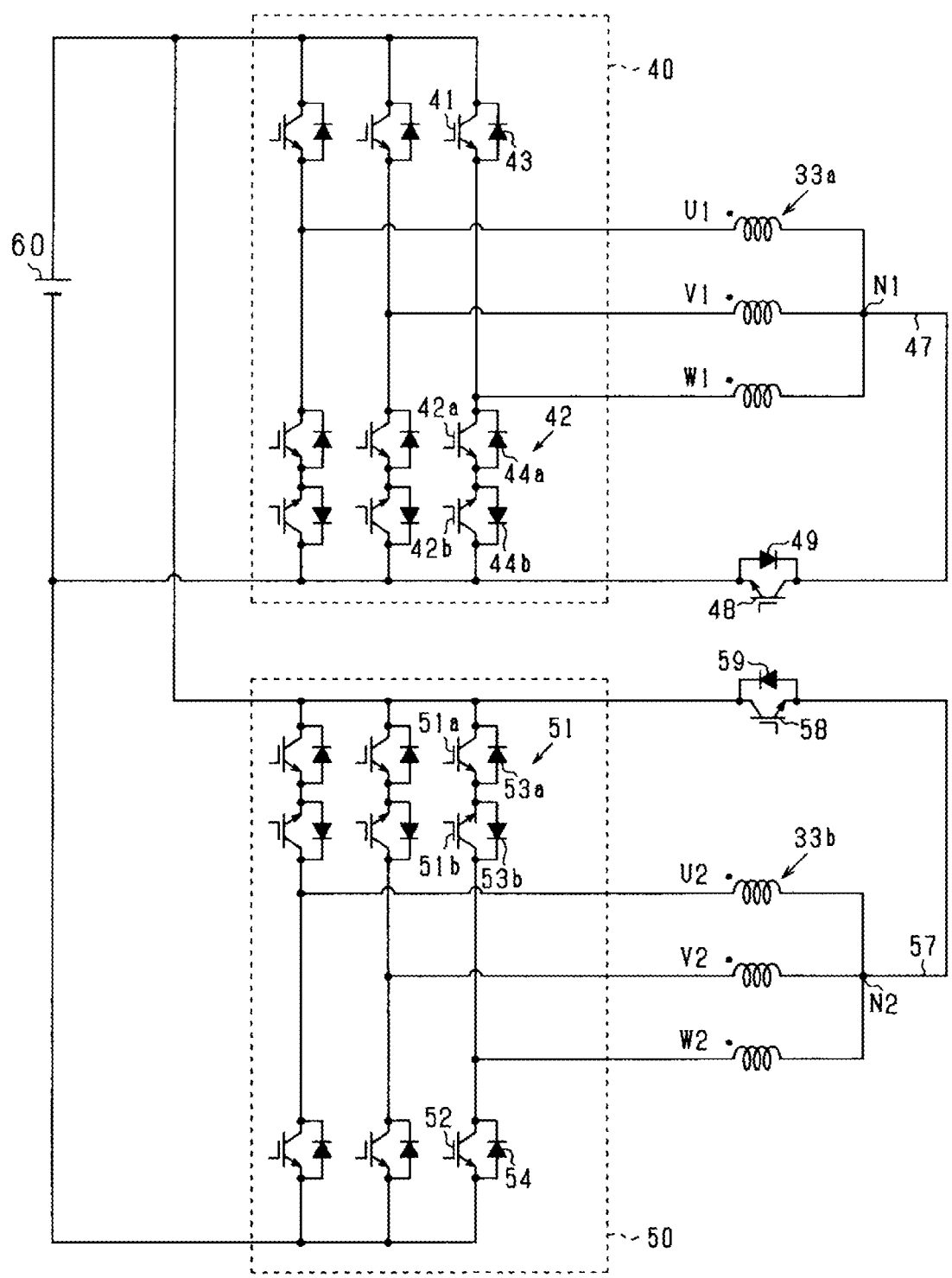
FIG. 12 is a schematic circuit diagram illustrating the configuration of a control system for controlling a rotating electric machine according to a second embodiment.

FIG. 12 shows the configuration of a control system for controlling (or drive apparatus for driving) a rotating electric machine 10 according to the second embodiment.

As shown in FIG. 12, in the present embodiment, in the first inverter 40, each of the lower-arm switches 42 is configured with a pair of semiconductor switching elements 42a and 42b connected in series with each other and having respective flyback diodes 44a and 44b oriented in opposite directions to each other. More particularly, in the present embodiment, the pair of semiconductor switching elements 42a and 42b is implemented by a pair of reverse-conducting IGBTs connected in anti-series with each other. Consequently, the pair of semiconductor switching elements 42a and 42b constitutes a bidirectional switch capable of bidirectionally conducting and bidirectionally blocking electric current. In addition, in the present embodiment, the pair of semiconductor switching elements 42a and 42b corresponds to a "first cut-off switch".

Similarly, in the second inverter 50, each of the upper-arm switches 51 is configured with a pair of semiconductor switching elements 51a and 51b connected in series with each other and having respective flyback diodes 53a and 53b oriented in opposite directions to each other. Specifically, the pair of semiconductor switching elements 51a and 51b is implemented by, for example, a pair of reverse-conducting IGBTs connected in anti-series with each other. Consequently, the pair of semiconductor switching elements 51a and 51b constitutes a bidirectional switch capable of bidirectionally conducting and bidirectionally blocking electric current. In addition, in the present embodiment, the pair of semiconductor switching elements 51a and 51b corresponds to a "second cut-off switch".

Figure 4:
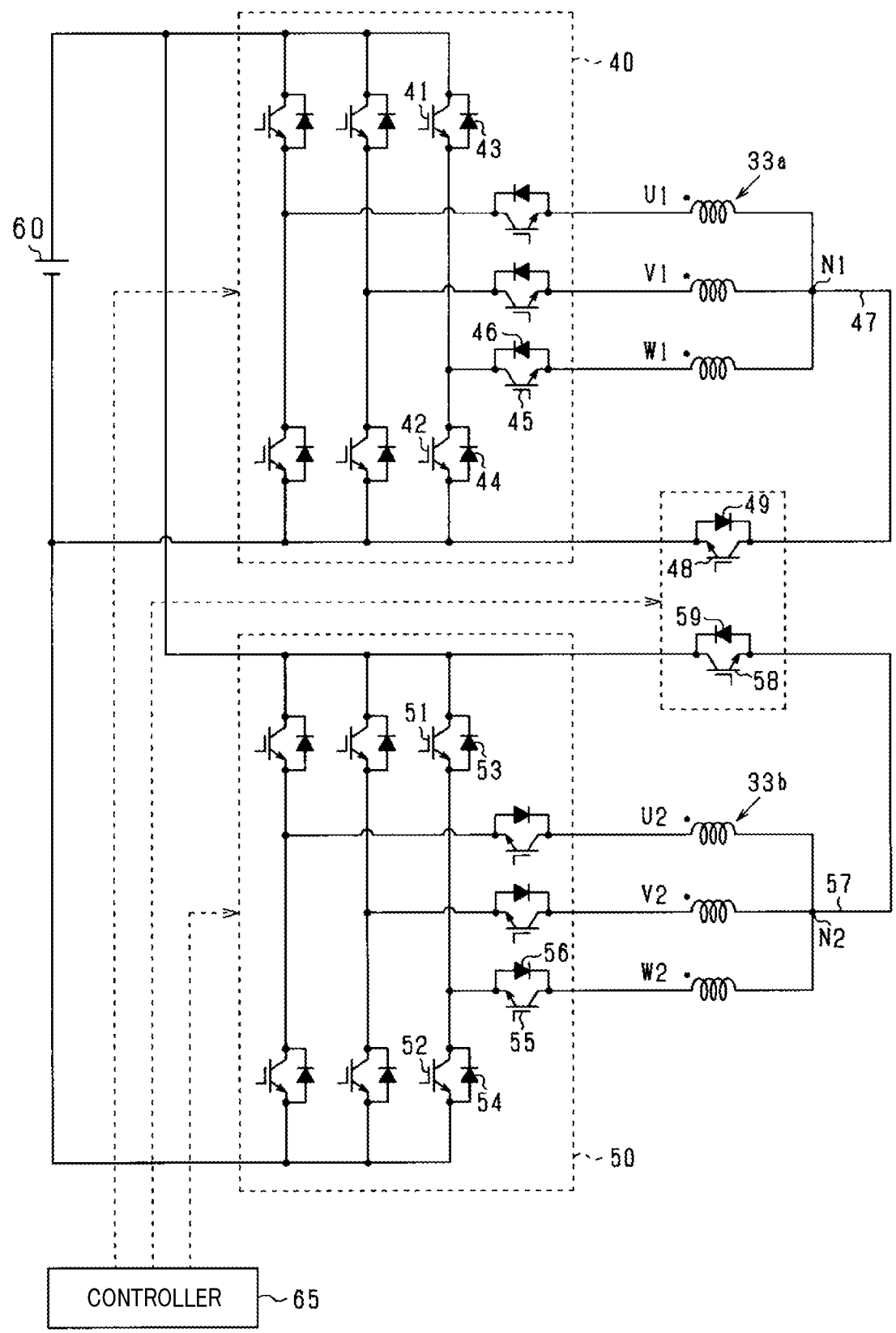
FIG. 4 is a schematic circuit diagram illustrating the configuration of a control system for controlling the rotating electric machine according to the first embodiment.

On the other hand, the upper-arm switches 41 of the first inverter 40 and the lower-arm switches 52 of the second inverter 50 in the present embodiment are respectively identical to those in the first embodiment (see FIG. 4).

In the present embodiment, in the full-wave drive mode of the rotating electric machine 10, in the first inverter 40, for each of the phase windings of the first three-phase coil 33a, of the pair of semiconductor switching elements 42a and 42b of the corresponding lower-arm switch 42, the semiconductor switching element 42a (i.e., the semiconductor switching element which has its flyback diode 44a oriented in the same direction as the flyback diode 43 of the corresponding upper-arm switch 41) and the corresponding upper-arm switch 41 are turned on and off in a complementary manner while the other semiconductor switching element 42b is kept in an ON state (or closed state). Similarly, in the second inverter 50, for each of the phase windings of the second three-phase coil 33b, of the pair of semiconductor switching elements 51a and 51b of the corresponding upper-arm switch 51, the semiconductor switching element 51a (i.e., the semiconductor switching element which has its flyback diode 53a oriented in the same direction as the flyback diode 54 of the corresponding lower-arm switch 52) and the corresponding lower-arm switch 52 are turned on and off in a complementary manner while the other semiconductor switching element 51b is kept in an ON state (or closed state).

In contrast, in the half-wave drive mode of the rotating electric machine 10, during the half-wave energization of the first three-phase coil 33a by the first inverter 40, for each of the phase windings of the first three-phase coil 33a, the corresponding upper-arm switch 41 is repeatedly turned on and off. At the same time, of the pair of semiconductor switching elements 42a and 42b of the corresponding lower-arm switch 42, the semiconductor switching element 42a is kept in the OFF state (or open state) while the other semiconductor switching element 42b is kept in the ON state (or closed state). Moreover, all of the upper-arm and lower-arm switches 51 and 52 of the second inverter 50 are kept in the OFF state (or open state).

Upon the elapse of one electrical half-cycle, the half-wave energization of the first three-phase coil 33a by the first inverter 40 is stopped and the half-wave energization of the second three-phase coil 33b by the second inverter 50 starts. Specifically, in the first inverter 40, the switching of each of the upper-arm switches 41 is stopped. Moreover, both the semiconductor switching elements 42a and 42b of each of the lower-arm switches 42 are placed in the OFF state (or open state). On the other hand, in the second inverter 50, for each of the phase windings of the second three-phase coil 33b, the corresponding lower-arm switch 52 is repeatedly turned on and off. At the same time, of the pair of semiconductor switching elements 51a and 51b of the corresponding upper-arm switch 51, the semiconductor switching element 51a is kept in the OFF state (or open state) while the other semiconductor switching element 51b is kept in the ON state (or closed state).

That is, in the half-wave drive mode of the rotating electric machine 10, the semiconductor switching elements 42a of the lower-arm switches 42 of the first inverter 40 in the present embodiment operate similarly to the lower-arm switches 42 of the first inverter 40 in the first embodiment. The semiconductor switching elements 42b of the lower-arm switches 42 of the first inverter 40 in the present embodiment operate similarly to the first additional switches 45 of the first inverter 40 in the first embodiment. The semiconductor switching elements 51a of the upper-arm switches 51 of the second inverter 50 in the present embodiment operate similarly to the upper-arm switches 51 of the second inverter 50 in the first embodiment. The semiconductor switching elements 51b of the upper-arm switches 51 of the second inverter 50 in the present embodiment operate similarly to the second additional switches 55 of the second inverter 50 in the first embodiment.

Moreover, in the present embodiment, during the shift from the half-wave energization of the first three-phase coil 33a by the first inverter 40 to the half-wave energization of the second three-phase coil 33b by the second inverter 50, in each of the lower-arm switches 42 of the first inverter 40, both the semiconductor switching elements 42a and 42b are placed in the OFF state (or open state); the flyback diodes 44a and 44b, which are oriented in opposite directions to each other, together bidirectionally block electric current from flowing therethrough. Consequently, the first return current paths R1 in the first inverter 40 (see FIG. 8) are cut off.

Similarly, during the shift from the half-wave energization of the second three-phase coil 33b by the second inverter 50 to the half-wave energization of the first three-phase coil 33a by the first inverter 40, in each of the upper-arm switches 51 of the second inverter 50, both the semiconductor switching elements 51a and 51b are placed in the OFF state (or open state); the flyback diodes 53a and 53b, which are oriented in opposite directions to each other, together bidirectionally block electric current from flowing therethrough. Consequently, the second return current paths R2 in the second inverter 50 (see FIG. 8) are cut off.

According to the present embodiment, it is possible to further achieve the following advantageous effects in comparison with the first embodiment.

With the configuration of the control system (or drive apparatus) according to the present embodiment, it becomes possible to reduce the number of serially-connected elements in a conducting state in each of the current conduction paths of the phase windings of the first and second three-phase coils 33a and 33b in the full-wave drive mode of the rotating electric machine 10, thereby reducing the conduction loss along each of the current conduction paths.

Moreover, in the present embodiment, in the full-wave drive mode of the rotating electric machine 10, of the pair of semiconductor switching elements 42a and 42b connected in anti-series with each other in each of the lower-arm switches 42 of the first inverter 40, the semiconductor switching element 42a is turned on and off while the other semiconductor switching element 42b is kept in the ON state. Similarly, of the pair of semiconductor switching elements 51a and 51b connected in anti-series with each other in each of the upper-arm switches 51 of the second inverter 50, the semiconductor switching element 51a is turned on and off while the other semiconductor switching element 51b is kept in the ON state. With the above energization control, it becomes possible to enable the current return operation when the power factor is not equal to 1 or enable regenerative operation. Consequently, it becomes possible to realize a more suitable full-wave drive of the rotating electric machine 10.

Third Embodiment

Figure 13:
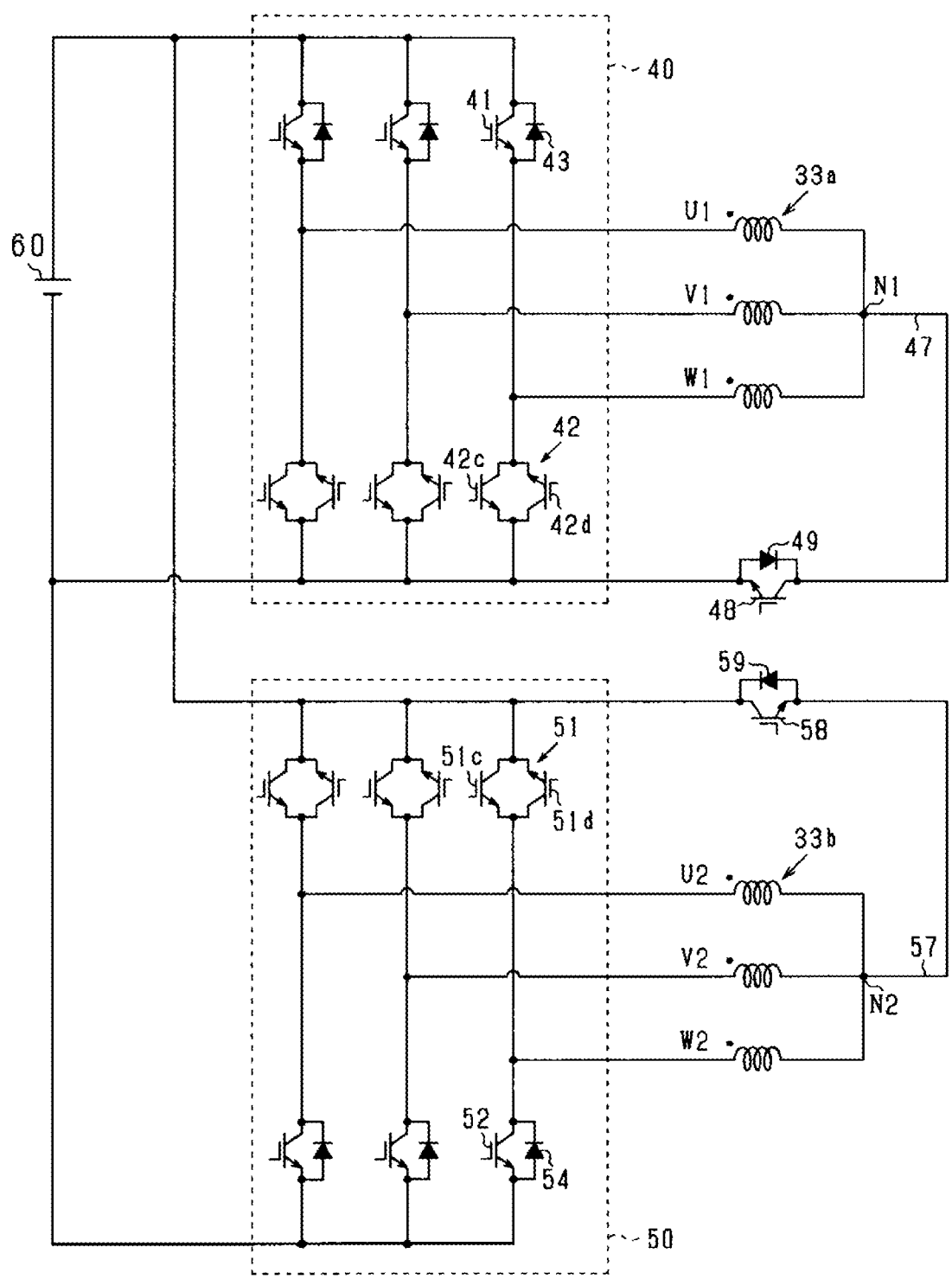
FIG. 13 is a schematic circuit diagram illustrating the configuration of a control system for controlling a rotating electric machine according to a third embodiment.

FIG. 13 shows the configuration of a control system for controlling (or drive apparatus for driving) a rotating electric machine 10 according to the third embodiment.

As shown in FIG. 13, in the present embodiment, in the first inverter 40, each of the lower-arm switches 42 is configured with a pair of IGBTs (Insulated Gate Bipolar Transistors) 42c and 42d connected in opposite directions and parallel to each other. The pair of IGBTs 42c and 42d is implemented by a pair of reverse-blocking IGBTs connected in antiparallel to each other. Consequently, each of the lower-arm switches 42 can function as a bidirectional switch to bidirectionally conduct and bidirectionally block electric current. More specifically, for each of the lower-arm switches 42, the IGBTs 42c and 42d forming the lower-arm switch 42 are connected in antiparallel to each other such that the IGBT 42c has its collector connected to the higher potential side and its emitter connected to the lower potential side, whereas the IGBT 42d has its emitter connected to the higher potential side and its collector connected to the lower potential side.

Similarly, in the second inverter 50, each of the upper-arm switches 51 is configured with a pair of IGBTs 51c and 51d connected in opposite directions and parallel to each other. The pair of IGBTs 51c and 51d is implemented by a pair of reverse-blocking IGBTs connected in antiparallel to each other. Consequently, each of the upper-arm switches 51 can function as a bidirectional switch to bidirectionally conduct and bidirectionally block electric current. More specifically, for each of the upper-arm switches 51, the IGBTs 51c and 51d forming the upper-arm switch 51 are connected in antiparallel to each other such that the IGBT 51c has its collector connected to the higher potential side and its emitter connected to the lower potential side, whereas the IGBT 51d has its emitter connected to the higher potential side and its collector connected to the lower potential side.

On the other hand, the upper-arm switches 41 of the first inverter 40 and the lower-arm switches 52 of the second inverter 50 in the present embodiment are respectively identical to those in the first embodiment (see FIG. 4).

In the present embodiment, in the full-wave drive mode of the rotating electric machine 10, in the first inverter 40, for each of the phase windings of the first three-phase coil 33a, of the pair of IGBTs 42c and 42d of the corresponding lower-arm switch 42, the IGBT 42c (i.e., the IGBT which has its collector connected to the corresponding upper-arm switch 41) and the corresponding upper-arm switch 41 are turned on and off in a complementary manner while the other IGBT 42d is kept in an ON state (or closed state). Similarly, in the second inverter 50, for each of the phase windings of the second three-phase coil 33b, of the pair of IGBTs 51c and 51d of the corresponding upper-arm switch 51, the IGBT 51c (i.e., the IGBT which has its emitter connected to the corresponding lower-arm switch 52) and the corresponding lower-arm switch 52 are turned on and off in a complementary manner while the other IGBT 51d is kept in an ON state (or closed state).

In contrast, in the half-wave drive mode of the rotating electric machine 10, during the half-wave energization of the first three-phase coil 33a by the first inverter 40, for each of the phase windings of the first three-phase coil 33a, the corresponding upper-arm switch 41 is repeatedly turned on and off. At the same time, of the pair of IGBTs 42c and 42d of the corresponding lower-arm switch 42, the IGBT 42c is kept in the OFF state (or open state) while the other IGBT 42d is kept in the ON state (or closed state). Moreover, all of the upper-arm and lower-arm switches 51 and 52 of the second inverter 50 are kept in the OFF state (or open state).

Upon the elapse of one electrical half-cycle, the half-wave energization of the first three-phase coil 33a by the first inverter 40 is stopped and the half-wave energization of the second three-phase coil 33b by the second inverter 50 starts. Specifically, in the first inverter 40, the switching of each of the upper-arm switches 41 is stopped. Moreover, both the IGBTs 42c and 42d of each of the lower-arm switches 42 are placed in the OFF state (or open state). On the other hand, in the second inverter 50, for each of the phase windings of the second three-phase coil 33b, the corresponding lower-arm switch 52 is repeatedly turned on and off. At the same time, of the pair of IGBTs 51c and 51d of the corresponding upper-arm switch 51, the IGBT 51c is kept in the OFF state (or open state) while the other IGBT 51d is kept in the ON state (or closed state).

That is, in the half-wave drive mode of the rotating electric machine 10, the IGBTs 42c of the lower-arm switches 42 of the first inverter 40 in the present embodiment operate similarly to the lower-arm switches 42 of the first inverter 40 in the first embodiment. The IGBTs 42d of the lower-arm switches 42 of the first inverter 40 in the present embodiment operate similarly to the first additional switches 45 of the first inverter 40 in the first embodiment. The IGBTs 51c of the upper-arm switches 51 of the second inverter 50 in the present embodiment operate similarly to the upper-arm switches 51 of the second inverter 50 in the first embodiment. The IGBTs 51d of the upper-arm switches 51 of the second inverter 50 in the present embodiment operate similarly to the second additional switches 55 of the second inverter 50 in the first embodiment.

Moreover, in the present embodiment, during the shift from the half-wave energization of the first three-phase coil 33a by the first inverter 40 to the half-wave energization of the second three-phase coil 33b by the second inverter 50, in each of the lower-arm switches 42 of the first inverter 40, both the IGBTs 42c and 42d are placed in the OFF state (or open state), thereby bidirectionally blocking electric current from flowing therethrough. Consequently, the first return current paths R1 in the first inverter 40 (see FIG. 8) are cut off.

Similarly, during the shift from the half-wave energization of the second three-phase coil 33b by the second inverter 50 to the half-wave energization of the first three-phase coil 33a by the first inverter 40, in each of the upper-arm switches 51 of the second inverter 50, both the IGBTs 51c and 51d are placed in the OFF state (or open state), thereby bidirectionally blocking electric current from flowing therethrough. Consequently, the second return current paths R2 in the second inverter 50 (see FIG. 8) are cut off.

As above, in the present embodiment, in the half-wave drive mode of the rotating electric machine 10, it is possible to realize suitable commutation between the phase windings of the first three-phase coil 33a and the phase windings of the second three-phase coil 33b. Consequently, it becomes possible to suitably perform the half-wave energization of the first three-phase coil 33a and the half-wave energization of the second three-phase coil 33b in a complementary manner.

Moreover, in the present embodiment, though each of the lower-arm switches 42 of the first inverter 40 and the upper-arm switches 51 of the second inverter 50 is configured with a pair of IGBTs connected in antiparallel to each other, the number of the switching elements placed in a conducting state (i.e., the number of serially-connected elements in each of the current conduction paths of the phase windings of the first and second three-phase coils 33a and 33b) in the half-wave drive mode is prevented from increasing. Consequently, it becomes possible to suppress increase in the conduction loss along each of the current conduction paths in the half-wave drive mode.

Furthermore, in the present embodiment, in the full-wave drive mode of the rotating electric machine 10, of the pair of the IGBTs 42c and 42d connected in antiparallel to each other in each of the lower-arm switches 42 of the first inverter 40, the IGBT 42c is turned on and off while the other IGBT 42d is kept in the ON state. Similarly, of the pair of IGBTs 51c and 51d connected in antiparallel to each other in each of the upper-arm switches 51 of the second inverter 50, the IGBT 51c is turned on and off while the other IGBT 51d is kept in the ON state. With the above energization control, it becomes possible to enable the current return operation when the power factor is not equal to 1 or enable regenerative operation. Consequently, it becomes possible to realize a more suitable full-wave drive of the rotating electric machine 10.

In addition, with the configuration of the control system (or drive apparatus) according to the present embodiment (see FIG. 13), it becomes possible to reduce the number of serially-connected elements in a conducting state in each of the current conduction paths of the phase windings of the first and second three-phase coils 33a and 33b in the full-wave drive mode in comparison with the configuration of the control system according to the second embodiment (see FIG. 12). Consequently, with the configuration of the control system according to the present embodiment, it becomes possible to reduce the conduction loss along each of the current conduction paths in the full-wave drive mode in comparison with the configuration of the control system according to the second embodiment.

Fourth Embodiment

Figure 14:
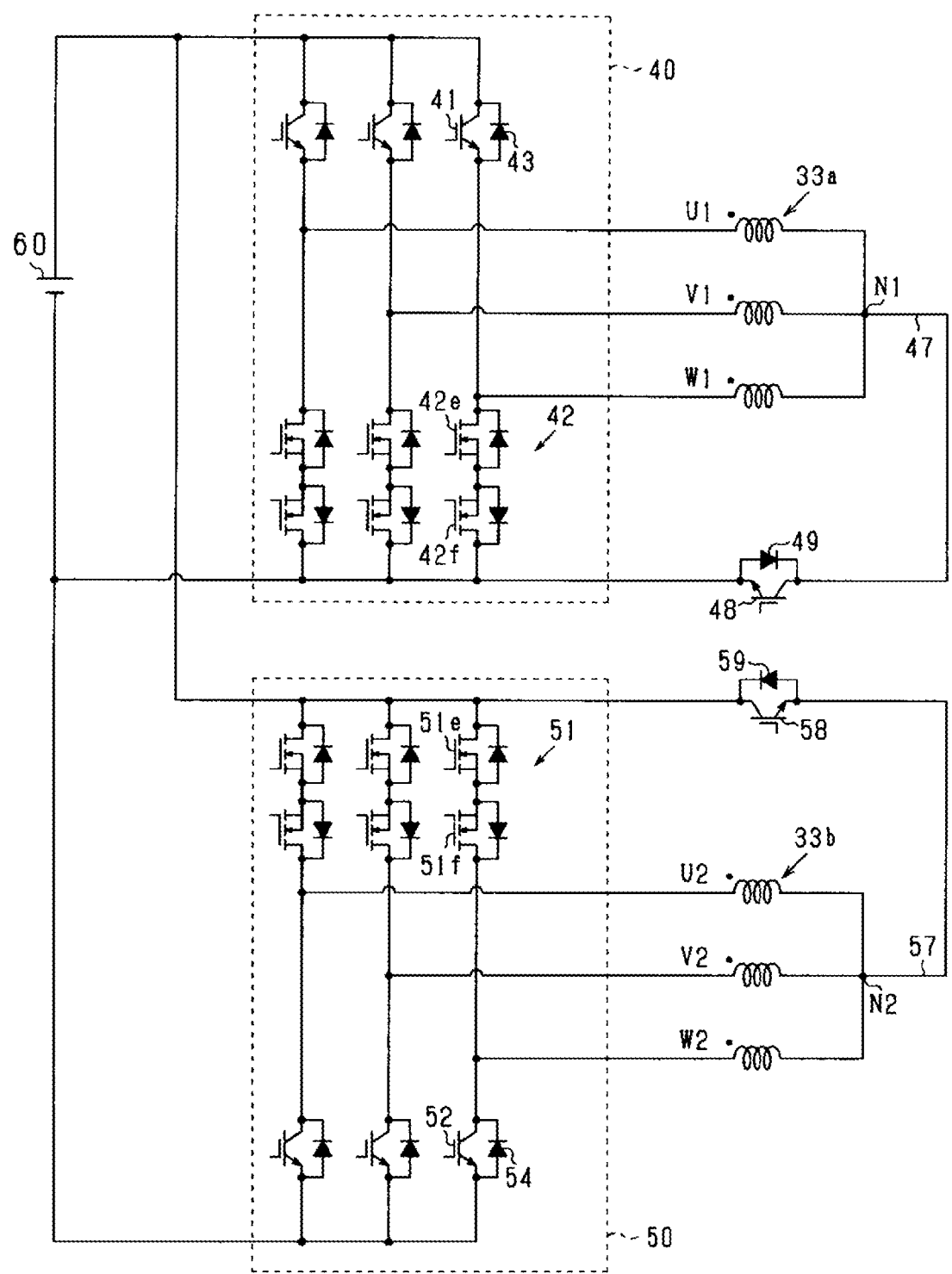
FIG. 14 is a schematic circuit diagram illustrating the configuration of a control system for controlling a rotating electric machine according to a fourth embodiment.

FIG. 14 shows the configuration of a control system for controlling (or drive apparatus for driving) a rotating electric machine 10 according to the fourth embodiment.

As shown in FIG. 14, in the present embodiment, in the first inverter 40, each of the lower-arm switches 42 is configured with a pair of MOSFETs (Metal-Oxide-Semiconductor Field-Effect Transistors) 42e and 42f. The MOSFETs 42e and 42f are formed of a wide-gap semiconductor material and connected in anti-series with each other. Consequently, the pair of MOSFETs 42e and 42f constitutes a bidirectional switch capable of bidirectionally conducting and bidirectionally blocking electric current. In addition, in the present embodiment, the pair of MOSFETs 42e and 42f corresponds to a "first cut-off switch".

Similarly, in the second inverter 50, each of the upper-arm switches 51 is configured with a pair of MOSFETs 51e and 51f. The MOSFETs 51e and 51f are formed of a wide-gap semiconductor material and connected in anti-series with each other. Consequently, the pair of MOSFETs 51e and 51f constitutes a bidirectional switch capable of bidirectionally conducting and bidirectionally blocking electric current. In addition, in the present embodiment, the pair of MOSFETs 51e and 51f corresponds to a "second cut-off switch".

On the other hand, the upper-arm switches 41 of the first inverter 40 and the lower-arm switches 52 of the second inverter 50 in the present embodiment are respectively identical to those in the first embodiment (see FIG. 4).

In addition, it is preferable that the wide-gap semiconductor material, of which the MOSFETs 42e-42f and 51e-51f are formed, is a SiC-based (i.e., silicon carbide-based) material or a GaN-based (i.e., gallium nitride-based) material.

With employment of the MOSFETs 42e-42f and 51e-51f formed of a wide-gap semiconductor material, it is possible to reduce the on-resistances of the lower-arm switches 42 of the first inverter 40 and the upper-arm switches 51 of the second inverter 50. Consequently, it becomes possible to further reduce the conduction loss during the switching of the upper-arm and lower-arm switches 41-42 and 51-52 of the first and second inverters 40 and 50 in the full-wave drive mode.

While the above particular embodiments have been shown and described, it will be understood by those skilled in the art that various modifications, changes, and improvements may be made without departing from the spirit of the present disclosure.

For example, in the above-described embodiments, each of the first and second shift switches 48 and 58 is configured with a semiconductor switching element (e.g., an IGBT). However, since the first and second shift switches 48 and 58 are used only for intermittently shifting the drive mode of the rotating electric machine 10 between the full-wave drive mode and the half-wave drive mode, it is not necessary for them to be configured with semiconductor switching elements. For example, each of the first and second shift switches 48 and 58 may alternatively be configured with a mechanical contact switch.

In the above-described embodiments, the number of turns of the first three-phase coil 33a and the number of turns of the second three-phase coil 33b are set to be equal to each other. However, the number of turns of the first three-phase coil 33a and the number of turns of the second three-phase coil 33b may alternatively be set to be different from each other. In this case, though the magnitude of electric current flowing through the first three-phase coil 33a and the magnitude of electric current flowing through the second three-phase coil 33b would become different from each other, it would still be possible to perform the half-wave drive of the rotating electric machine 10.

In the above-described embodiments, the stator coil 33 consists of the first and second three-phase coils 33a and 33b. However, the number of phases of each of the coils constituting the stator coil 33 may alternatively be set to an arbitrary number greater than three such that each of the coils has a neutral point defined between the phase windings thereof. For example, the number of phases of each of the coils constituting the stator coil 33 may alternatively be set to five.

In the above-described embodiments, both the first and second inverters 40 and 50 are connected with the same DC power supply 60. However, the first and second inverters 40 and 50 may alternatively be connected with two different DC power supplies.

In the above-described embodiments, the rotating electric machine 10 is configured to have a magnet rotor structure. However, the rotating electric machine 10 may alternatively be configured to have an induction rotor structure. In the above-described embodiments, the rotating electric machine 10 is configured to have an inner rotor structure. However, the rotating electric machine 10 may alternatively be configured to have an outer rotor structure.

What is claimed is:

1. A drive apparatus for driving a rotating electric machine,
the rotating electric machine comprising a stator core and first and second multi-phase coils wound on the stator core, the first multi-phase coil being composed of at least three phase windings that are connected together to define a first neutral point therebetween, the second multi-phase coil being composed of at least three phase windings that are connected together to define a second neutral point therebetween,
the drive apparatus comprising:
a first inverter connected with a DC power supply, the first inverter including at least three switch pairs respectively corresponding to the phase windings of the first multi-phase coil and each consisting of an upper-arm switch and a lower-arm switch that are connected in series with each other, the first inverter being configured to energize each of the phase windings of the first multi-phase coil by turning on and off the corresponding upper-arm and lower-arm switches of the first inverter;
a second inverter connected with the DC power supply, the second inverter including at least three switch pairs respectively corresponding to the phase windings of the second multi-phase coil and each consisting of an upper-arm switch and a lower-arm switch that are connected in series with each other, the second inverter being configured to energize each of the phase windings of the second multi-phase coil by turning on and off the corresponding upper-arm and lower-arm switches of the second inverter;
a first shift switch provided in an electrical path that connects the first neutral point of the first multi-phase coil to a lower potential side of the DC power supply;
a second shift switch provided in an electrical path that connects the second neutral point of the second multi-phase coil to a higher potential side of the DC power supply;
a first energization controller configured to control energization of the first and second multi-phase coils by turning on and off, for each of the phase windings of the first and second multi-phase coils, the corresponding upper-arm and lower-arm switches in a complementary manner for a same energization period while keeping both the first and second shift switches in an OFF state; and
a second energization controller configured to control energization of the first and second multi-phase coils by turning on and off, for each corresponding pair of one of the phase windings of the first multi-phase coil and one of the phase windings of the second multi-phase coil, the upper-arm switch of the first inverter corresponding to the phase winding of the first multi-phase coil and the lower-arm switch of the second inverter corresponding to the phase winding of the second multi-phase coil respectively for first energization periods and second energization periods while keeping both the first and second shift switches in an ON state, the first energization periods being set alternately with the second energization periods,
wherein
each of the upper-arm and lower-arm switches of the first and second inverters is configured with a semiconductor switching element having a flyback diode connected in antiparallel thereto,
the first inverter further includes a plurality of first cut-off switches each of which is configured to cut off, during a shift from an energization state where a corresponding one of the upper-arm switches of the first inverter is turned on and off by the second energization controller to an energization state where a corresponding one of the lower-arm switches of the second inverter is turned on and off by the second energization controller, a first return current path that includes the flyback diode of a corresponding one of the lower-arm switches of the first inverter and a corresponding one of the phase windings of the first multi-phase coil, and the second inverter further includes a plurality of second cut-off switches each of which is configured to cut off, during a shift from an energization state where a corresponding one of the lower-arm switches of the second inverter is turned on and off by the second energization controller to an energization state where a corresponding one of the upper-arm switches of the first inverter is turned on and off by the second energization controller, a second return current path that includes the flyback diode of a corresponding one of the upper-arm switches of the second inverter and a corresponding one of the phase windings of the second multi-phase coil.

2. The drive apparatus as set forth in claim 1, wherein each of the first cut-off switches is provided in an AC line, which connects an intermediate point between the corresponding upper-arm and lower-arm switches of the first inverter and the corresponding phase winding of the first multi-phase coil, to selectively allow and block flow of electric current through the AC line, each of the second cut-off switches is provided in an AC line, which connects an intermediate point between the corresponding upper-arm and lower-arm switches of the second inverter and the corresponding phase winding of the second multi-phase coil, to selectively allow and block flow of electric current through the AC line, the first energization controller is configured to keep, when controlling energization of the first and second multi-phase coils, both the first and second shift switches in the OFF state and all of the first and second cut-off switches of the first and second inverters in an ON state, and the second energization controller is configured to:

keep, during each of the first energization periods for which one of the upper-arm switches of the first inverter is turned on and off, both the first and second shift switches in the ON state, the first cut-off switch corresponding to the upper-arm switch of the first inverter in the ON state and the second cut-off switch corresponding to the upper-arm switch of the first inverter in an OFF state; and keep, during each of the second energization periods for which one of the lower-arm switches of the second inverter is turned on and off, both the first and second shift switches in the ON state, the first cut-off switch corresponding to the lower-arm switch of the second inverter in an OFF state and the second cut-off switch corresponding to the lower-arm switch of the second inverter in the ON state.

3. The drive apparatus as set forth in claim 1, wherein each of the lower-arm switches of the first inverter is configured with a pair of semiconductor switching elements connected in series with each other and having respective flyback diodes oriented in opposite directions to each other, each of the upper-arm switches of the second inverter is configured with a pair of semiconductor switching elements connected in series with each other and having respective flyback diodes oriented in opposite directions to each other, each of the first cut-off switches is constituted of the pair of semiconductor switching elements of the corresponding lower-arm switch of the first inverter, and each of the second cut-off switches is constituted of the pair of semiconductor switching elements of the corresponding upper-arm switch of the second inverter.

4. The drive apparatus as set forth in claim 3, wherein the first energization controller is configured to:

turn on and off, for each of the phase windings of the first multi-phase coil, the corresponding upper-arm switch of the first inverter and one of the pair of semiconductor switching elements of the corresponding lower-arm switch of the first inverter in a complementary manner while keeping the other of the pair of semiconductor switching elements of the corresponding lower-arm switch in an ON state; and turn on and off, for each of the phase windings of the second multi-phase coil, the corresponding lower-arm switch of the second inverter and one of the pair of semiconductor switching elements of the corresponding upper-arm switch of the second inverter in a complementary manner while keeping the other of the pair of semiconductor switching elements of the corresponding upper-arm switch in an ON state.

5. The drive apparatus as set forth in claim 1, wherein the first energization controller is configured to control, during operation of the rotating electric machine in a first operation region on a lower rotational speed side, energization of the first and second multi-phase coils with both the first and second shift switches kept in the OFF state, and the second energization controller is configured to control, during operation of the rotating electric machine in a second operation region on a higher rotational speed side, energization of the first and second multi-phase coils with both the first and second shift switches kept in the ON state.

6. The drive apparatus as set forth in claim 1, wherein the number of turns of the first multi-phase coil is equal to the number of turns of the second multi-phase coil, and the first and second multi-phase coils are wound on the stator core so as to have each corresponding pair of one of the phase windings of the first multi-phase coil and one of the phase windings of the second multi-phase coil, which are of the same phase, received in same slots of the stator core.

7. The drive apparatus as set forth in claim 6, wherein both the first and second multi-phase coils are formed of electrical conductors having a rectangular cross-sectional shape.

8. A drive apparatus for driving a rotating electric machine, the rotating electric machine comprising a stator core and first and second multi-phase coils wound on the stator core, the first multi-phase coil being composed of at least three phase windings that are connected together to define a first neutral point therebetween, the second multi-phase coil being composed of at least three phase windings that are connected together to define a second neutral point therebetween, the drive apparatus comprising:

a first inverter connected with a DC power supply, the first inverter including at least three switch pairs respectively corresponding to the phase windings of the first multi-phase coil and each consisting of an upper-arm switch and a lower-arm switch that are connected in series with each other, the first inverter being configured to energize each of the phase windings of the first multi-phase coil by turning on and off the corresponding upper-arm and lower-arm switches of the first inverter;

a second inverter connected with the DC power supply, the second inverter including at least three switch pairs respectively corresponding to the phase windings of the second multi-phase coil and each consisting of an upper-arm switch and a lower-arm switch that are connected in series with each other, the second inverter being configured to energize each of the phase windings of the second multi-phase coil by turning on and off the corresponding upper-arm and lower-arm switches of the second inverter;

a first shift switch provided in an electrical path that connects the first neutral point of the first multi-phase coil to a lower potential side of the DC power supply;

a second shift switch provided in an electrical path that connects the second neutral point of the second multi-phase coil to a higher potential side of the DC power supply;

a first energization controller configured to control energization of the first and second multi-phase coils by turning on and off, for each of the phase windings of the first and second multi-phase coils, the corresponding upper-arm and lower-arm switches in a complementary manner for a same energization period while keeping both the first and second shift switches in an OFF state; and a second energization controller configured to control energization of the first and second multi-phase coils by turning on and off, for each corresponding pair of one of the phase windings of the first multi-phase coil and one of the phase windings of the second multi-phase coil, the upper-arm switch of the first inverter corresponding to the phase winding of the first multi-phase coil and the lower-arm switch of the second inverter corresponding to the phase winding of the second multi-phase coil respectively for first energization periods and second energization periods while keeping both the first and second shift switches in an ON state, the first energization periods being set alternately with the second energization periods, wherein each of the upper-arm switches of the first inverter is configured with a semiconductor switching element having a flyback diode connected in antiparallel thereto, each of the lower-arm switches of the first inverter is configured with a pair of IGBTs (Insulated Gate Bipolar Transistors) connected in antiparallel to each other, each of the upper-arm switches of the second inverter is configured with a pair of IGBTs connected in antiparallel to each other, each of the lower-arm switches of the second inverter is configured with a semiconductor switching element having a flyback diode connected in antiparallel thereto, for each of the lower-arm switches of the first inverter, a first return current path, which includes the lower-arm switch of the first inverter and a corresponding one of the phase windings of the first multi-phase coil, is cut off by the pair of IGBTs of the lower-arm switch during a shift from an energization state where a corresponding one of the upper-arm switches of the first inverter is turned on and off by the second energization controller to an energization state where a corresponding one of the lower-arm switches of the second inverter is turned on and off by the second energization controller, and for each of the upper-arm switches of the second inverter, a second return current path, which includes the upper-arm switch of the second inverter and a corresponding one of the phase windings of the second multi-phase coil, is cut off by the pair of IGBTs of the upper-arm switch during a shift from an energization state where a corresponding one of the lower-arm switches of the second inverter is turned on and off by the second energization controller to an energization state where a corresponding one of the upper-arm switches of the first inverter is turned on and off by the second energization controller.

9. The drive apparatus as set forth in claim 8, wherein the first energization controller is configured to:

turn on and off, for each of the phase windings of the first multi-phase coil, the corresponding upper-arm switch of the first inverter and one of the pair of IGBTs of the corresponding lower-arm switch of the first inverter in a complementary manner while keeping the other of the pair of IGBTs of the corresponding lower-arm switch in an ON state; and turn on and off, for each of the phase windings of the second multi-phase coil, the corresponding lower-arm switch of the second inverter and one of the pair of IGBTs of the corresponding upper-arm switch of the second inverter in a complementary manner while keeping the other of the pair of IGBTs of the corresponding upper-arm switch in an ON state.

10. The drive apparatus as set forth in claim 8, wherein the first energization controller is configured to control, during operation of the rotating electric machine in a first operation region on a lower rotational speed side, energization of the first and second multi-phase coils with both the first and second shift switches kept in the OFF state, and the second energization controller is configured to control, during operation of the rotating electric machine in a second operation region on a higher rotational speed side, energization of the first and second multi-phase coils with both the first and second shift switches kept in the ON state.

11. The drive apparatus as set forth in claim 8, wherein the number of turns of the first multi-phase coil is equal to the number of turns of the second multi-phase coil, and the first and second multi-phase coils are wound on the stator core so as to have each corresponding pair of one of the phase windings of the first multi-phase coil and one of the phase windings of the second multi-phase coil, which are of the same phase, received in same slots of the stator core.

12. The drive apparatus as set forth in claim 11, wherein both the first and second multi-phase coils are formed of electrical conductors having a rectangular cross-sectional shape.

* * * * *